(12) United States Patent
Kondo et al.

(10) Patent No.: US 9,966,604 B2
(45) Date of Patent: May 8, 2018

(54) ELECTROCHEMICAL DEVICE

(71) Applicant: SEIKO EPSON CORPORATION, Tokyo (JP)

(72) Inventors: Shigeo Kondo, Hirakata (JP); Yasumasa Takeuchi, Yokohama (JP); Yuji Shinohara, Kofu (JP); Takeo Kawase, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 302 days.

(21) Appl. No.: 14/561,725

(22) Filed: Dec. 5, 2014

(65) Prior Publication Data
US 2015/0086874 A1    Mar. 26, 2015

Related U.S. Application Data

(63) Continuation of application No. 14/081,482, filed on Nov. 15, 2013, which is a continuation of application (Continued)

(30) Foreign Application Priority Data

Sep. 25, 2007  (JP) .................................. 2007-248279

(51) Int. Cl.
*H01M 4/62* (2006.01)
*H01M 10/42* (2006.01)
(Continued)

(52) U.S. Cl.
CPC ............. *H01M 4/62* (2013.01); *H01M 2/021* (2013.01); *H01M 2/0222* (2013.01);
(Continued)

(58) Field of Classification Search
CPC ... H01M 4/62; H01M 10/4235; H01M 10/056
See application file for complete search history.

(56) References Cited

U.S. PATENT DOCUMENTS

| 4,965,151 A | 10/1990 | Takada et al. |
| 5,895,733 A | 4/1999 | Crespi et al. |

(Continued)

FOREIGN PATENT DOCUMENTS

| JP | A-63-051064 | 3/1988 |
| JP | A-7-161346 | 6/1995 |

(Continued)

OTHER PUBLICATIONS

Minami et al. Solid State Ionics for Batteries 2005.*
(Continued)

*Primary Examiner* — Ula C Ruddock
*Assistant Examiner* — Frank A Chernow
(74) *Attorney, Agent, or Firm* — Oliff PLC

(57) ABSTRACT

An electrochemical device manufactured using an electrode layer in which severe increase of electrode resistance is prevented and/or a solid electrolyte layer in which severe decrease of ion conductivity of a solid electrolyte is prevented is provided. The electrochemical device includes a pair of electrode layers, and a solid electrolyte layer provided between the pair of electrode layers, wherein at least one layer of the electrode layers and the solid electrolyte layer is composed of first particles each providing a function of the at least one layer, second particles and a binder which is composed of an organic polymer and binds the first and second particles, and wherein the at least one layer is formed from a mixture material containing the first particles and binder particles, each of the binder particles including the second particle and the binder carried on at least a part of a surface thereof.

9 Claims, 10 Drawing Sheets

Vertical section view showing molds for forming electrode layer

Related U.S. Application Data

No. 12/232,794, filed on Sep. 24, 2008, now Pat. No. 8,614,020.

(51) Int. Cl.

| | | |
|---|---|---|
| *H01M 2/02* | (2006.01) | |
| *H01M 4/04* | (2006.01) | |
| *H01M 4/139* | (2010.01) | |
| *H01M 6/18* | (2006.01) | |
| *H01M 10/0562* | (2010.01) | |
| *H01M 10/36* | (2010.01) | |
| *H01M 10/056* | (2010.01) | |
| *H01M 4/13* | (2010.01) | |
| *H01M 10/052* | (2010.01) | |
| *H01M 10/0565* | (2010.01) | |

(52) U.S. Cl.
CPC ........... *H01M 4/0435* (2013.01); *H01M 4/13* (2013.01); *H01M 4/139* (2013.01); *H01M 4/621* (2013.01); *H01M 4/622* (2013.01); *H01M 6/18* (2013.01); *H01M 10/056* (2013.01); *H01M 10/0562* (2013.01); *H01M 10/36* (2013.01); *H01M 10/4235* (2013.01); *H01M 10/4285* (2013.01); *H01M 2/0217* (2013.01); *H01M 10/052* (2013.01); *H01M 10/0565* (2013.01); *H01M 2220/30* (2013.01)

(56) References Cited

U.S. PATENT DOCUMENTS

| | | |
|---|---|---|
| 6,670,070 B2 | 12/2003 | Yoshioka et al. |
| 7,368,202 B2 | 5/2008 | Kurihara et al. |
| 8,614,020 B2 | 12/2013 | Kondo et al. |
| 2002/0055041 A1 | 5/2002 | Kobayashi et al. |
| 2003/0138697 A1 | 7/2003 | Leising et al. |
| 2005/0034299 A1* | 2/2005 | Kurihara et al. ............ 29/623.5 |
| 2005/0123829 A1* | 6/2005 | Fukui .................. H01M 4/0471 429/164 |
| 2006/0248710 A1* | 11/2006 | Fukumoto et al. .......... 29/623.5 |
| 2008/0020271 A1* | 1/2008 | Sato .................... H01M 4/0416 429/129 |
| 2008/0057355 A1 | 3/2008 | Ajiki |
| 2008/0274411 A1 | 11/2008 | Nakajima et al. |
| 2009/0267028 A1* | 10/2009 | Hoshiba ................. H01G 11/38 252/500 |

FOREIGN PATENT DOCUMENTS

| | | | |
|---|---|---|---|
| JP | A-11-007942 | 1/1999 | |
| JP | A-2005-44794 | 2/2005 | |
| WO | WO 99/67840 A1 | 12/1999 | |
| WO | WO 2007/049872 A1 * | 5/2007 | ............. H01M 4/02 |

OTHER PUBLICATIONS

Minami et al. Solid State Ionics for Batteries, 2005.
Jones et al., "A thin-film solid-state microbattery," *Journal of Power Sources,* 43-44, pp. 505-513, 1993.
Iwamoto et al., "Solid State Lithium Battery with $Li_2 FeS_2$ as Anode Material," *Denki Kagaku Oyobi Kogyo Butsuri Kagaku,* 66, No. 9, 1998 (with abstract and translation).
Jan. 1, 2014 Office Action issued in U.S. Appl. No. 14/081,482.
U.S. Appl. No. 14/081,482, filed Nov. 15, 2013 in the name of Kondo et al.
May 21, 2015 Office Action issued in U.S. Appl. No. 14/081,482.

* cited by examiner

Schematic view showing apparatus for forming solid electrolyte layer and electrode layer each having sheet shape Vertical section view showing all-solid secondary battery having coin shape Initial charge-discharge property of silver-ion-conducting all-solid secondary battery Property of discharge voltage against discharge current density of silver-ion-conducting all-solid secondary battery ○ ; All-solid secondary battery manufactured in present invention
△ ; All-solid secondary battery manufactured using conventional method

ELECTROCHEMICAL DEVICE

CROSS-REFERENCE TO RELATED APPLICATION

This is a continuation of application Ser. No. 14/081,482 filed Nov. 15, 2013, which is a continuation of application Ser. No. 12/232,794 filed Sep. 24, 2008, which claims priority to Japanese Patent Application No. 2007-248279 filed on Sep. 25, 2007 which is hereby expressly incorporated by reference herein in its entirety.

BACKGROUND

1. Technical Field

Several aspects of the present invention relates to an electrochemical device and, more particularly, an electrochemical device having an electrode layer and/or a solid electrolyte layer formed using binder particles, each of the binder particles including a particle and a binder carried on at least a part of a surface thereof.

2. Related Art

Along with development of portable equipments such as a personal computer and a cellular phone, demand for a small-sized lightweight battery as a power source of the portable equipments shows a drastic increase in recent years.

In particular, it is predicted that a lithium battery realizes a high energy density since lithium has a reduced atomic weight and increased ionization energy. Extensive research has been made in this respect, as a result of which the lithium battery is widely used as a power source of the portable equipments these days.

Expansion of a lithium battery market demands a lithium battery having a higher energy density. In order to comply with such a demand, internal energy of the lithium battery has been made greater by increasing the quantity of an active material contained in the battery.

Concomitant with this trend, a noticeable increase has been made in the quantity of an organic solvent contained in an electrolyte (an electrolytic solution) which is a flammable material filled in the battery. This results in an increased danger of battery firing and, therefore, the problem of battery safety becomes at issue in recent years.

One of highly effective methods for assuring the safety of a lithium battery is to replace the electrolyte containing the organic solvent with a nonflammable solid electrolyte. Among others, use of a lithium-ion-conducting inorganic solid electrolyte makes it possible to develop an all-solid lithium battery that exhibits improved safety. Active research is now being made in this connection.

As an example, S. D. Jones and J. R. Akridge, J. Power Sources, 43-44, 505 (1993) discloses an all-solid thin film lithium secondary battery produced by sequentially forming a cathode thin film, an electrolyte thin film and an anode thin film through the use of a deposition apparatus or a sputtering apparatus. It was reported that the thin film lithium secondary battery exhibits superior charge-discharge cycle properties of several thousand cycles or more.

With this thin film lithium secondary battery, however, it is impossible for a battery device to retain an electrode active material in a large quantity, thereby making it difficult to obtain a high capacity battery. In order to increase the battery capacity, a great quantity of electrode active materials should be contained in an electrode.

For this purpose, electrodes of a bulk type battery are composed of an electrode mixture material containing electrolyte particles and electrode active material particles. This makes it possible to maintain an ion-conducting path and an electron-conducting path in the electrodes, and to obtain a bulk type battery having a high capacity.

The bulk type battery is typically manufactured by compression-molding the entire battery device within a mold of a press machine, taking out the battery device from the mold and placing the battery device into a coin type battery container.

However, in the case of the bulk type battery, particularly, an all-solid lithium secondary battery using a sulfide-based lithium-ion-conducting solid electrolyte (a sulfide-based lithium-ion conductor), it is known that the capacity thereof is reduced by about 7% from its initial capacity when subjected to several cycles of charge-discharge operations at most (see, e.g., DENKI KAGAKU, 66, No. 9 (1998)).

Thus, there is currently a demand for development of a bulk type all-solid lithium secondary battery having improved performance and being capable of preventing reduction of a battery capacity over the lapse of charge-discharge cycles.

In the all-solid secondary battery having such a structure, in order to improve strengths of the electrode layers and the solid electrolyte layer, it is proposed that materials containing a binder composed of an organic polymer are used as constituent materials thereof (see, e.g. JP-A-07-161346).

In the case of the solid electrolyte layer containing such a binder, it can be formed by mixing the electrolyte particles with an organic solvent dissolving the binder therein to obtain an electrolyte paste, applying the electrolyte paste onto a substrate, and then drying the same.

In the case of the electrode layer containing the above binder, it can be formed by adding an organic solvent dissolving the binder therein to the electrode mixture material containing electrode active material particles, electrolyte particles and, if need, conducting particles such as carbon particles to obtain an electrode paste, applying the electrode paste onto a substrate, and then drying the same.

As another method, the solid electrolyte layer or the electrode layer can be formed by removing the organic solvent from the above electrolyte paste or the above electrode paste to obtain a solid matter, crushing the obtained solid matter, and then press-molding the same into a mold.

In this case, since the organic polymer as the binder is dissolved in the organic solvent, the organic polymer exists in the organic solvent in a state that it electrically polarizes. As a result, a degree of polarization (adsorption potential) of the organic polymer affects potentials of the solid electrolyte and the electrode active material.

Specifically, in the case where the solid electrolyte layer is formed using a material containing the organic polymer in a polarized state as the binder, the organic polymer affects ion conductivity of the solid electrolyte, as a result of which the ion conductivity of the solid electrolyte layer has often been reduced. From the same reason, electrical resistivity of the formed electrode layer becomes high.

This is because the organic polymer in a polarized state reacts with the solid electrolyte or the electrode active material, and thereby a state that gateways of ion-conducting channels (paths) thereof are sealed by the organic polymer is generated in the paste.

Therefore, in the case where the solid electrolyte layer or the electrode layer is formed by drying such a paste, the above state is maintained in the formed layer. As a result, in the case of the electrode layer, impedance thereof is increased, whereas in the case of the solid electrolyte layer, the ion conductivity thereof is decreased.

For these reasons, internal resistance of the all-solid secondary battery having such electrode layer and solid electrolyte layer becomes extremely high, and an output current thereof becomes low. Therefore, such an all-solid secondary battery lacks in practicality.

In order to solve such a problem, it may be conceived that the solid electrolyte layer or the electrode layer is formed using a mixture material containing dried organic polymer particles as the binder.

However, if the mixture material is prepared by mixing the organic polymer particles with the electrolyte particles or the electrode active material particles when forming the solid electrolyte layer or the electrode layer, the organic polymer particles are bonded together in the mixture material, as a result of which the electrolyte particles or the electrode active material particles cannot be mixed with the organic polymer particles sufficiently.

Therefore, the formed solid electrolyte layer or the electrode layer cannot have excellent strength and a stable electrochemical property. This produces a problem in that an all-solid secondary battery manufactured using such a solid electrolyte layer and/or such an electrode layer also cannot have excellent strength and a stable charge-discharge property.

SUMMARY

Accordingly, it is an object of the present invention to provide an electrochemical device manufactured using an electrode layer in which severe increase of electrode resistance is prevented and/or a solid electrolyte layer in which severe decrease of ion conductivity of a solid electrolyte is prevented.

An aspect of the present invention is directed to an electrochemical device. The electrochemical device comprises a pair of electrode layers, and a solid electrolyte layer provided between the pair of electrode layers, wherein at least one layer of the electrode layers and the solid electrolyte layer is composed of first particles each providing a function of the at least one layer, second particles and a binder which is composed of an organic polymer and binds the first and second particles, and wherein the at least one layer is formed from a mixture material containing the first particles and binder particles, each of the binder particles including the second particle and the binder carried on at least a part of a surface thereof.

This makes it possible to provide an electrochemical device manufactured using an electrode layer in which severe increase of electrode resistance is prevented and/or a solid electrolyte layer in which severe decrease of ion conductivity of a solid electrolyte is prevented.

In the above electrochemical device, it is preferred that the at least one layer is the electrode layer, the first particles include electrode active material particles each providing the function of the electrode layer, and the second particles include at least one kind selected from the group comprising electrochemically inactive conducting particles, electrochemically inactive insulating particles and electrolyte particles.

This makes it possible to improve binding strength between the first and second particles through the binder, while reducing inhibition of an electrochemical reaction by the binder in the electrode layer.

In the above electrochemical device, it is preferred that the at least one layer is the solid electrolyte layer, the first particles include electrolyte particles each providing the function of the solid electrolyte layer, and the second particles include at least one kind selected from the group comprising electrochemically inactive insulating particles and electrolyte particles.

This makes it possible to improve binding strength between the first and second particles through the binder, while reducing inhibition of an electrochemical reaction by the binder in the solid electrolyte layer.

In the above electrochemical device, it is preferred that the organic polymer is at least one kind selected from the group comprising styrene-based thermoplastic elastomer, polyolefin, polyamide, polyimide and hot-melt resin as a major component thereof.

This makes it possible to improve binding strength between the first and second particles through the binder, while reducing inhibition of an electrochemical reaction by the binder in the electrode layer and/or the solid electrolyte layer.

In the above electrochemical device, it is preferred that an amount of the binder to an amount of the mixture material is in the range of 0.5 to 20 wt %.

This makes it possible to improve binding strength between the first and second particles through the binder, while reducing inhibition of an electrochemical reaction by the binder in the electrode layer and/or the solid electrolyte layer.

In the above electrochemical device, it is preferred that the electrolyte particles are composed of a lithium-ion-conducting solid electrolyte or a silver-ion-conducting solid electrolyte.

This makes it possible to obtain an electrochemical device having an excellent property. Therefore, the electrochemical device of the present invention may be used for constructing various kinds of all-solid secondary batteries, but is preferably used for a lithium-ion-conducting all-solid secondary battery (an all-solid lithium secondary battery) or a silver-ion-conducting all-solid secondary battery (an all-solid silver secondary battery). These all-solid secondary batteries can exhibit excellent charge-discharge properties.

In the above electrochemical device, it is preferred that the electrolyte particles are composed of a lithium-ion-conducting solid electrolyte or a silver-ion-conducting solid electrolyte.

This makes it possible to obtain an electrochemical device having an excellent property. Therefore, the electrochemical device may be used for constructing various kinds of all-solid secondary batteries, but is preferably used for a lithium-ion-conducting all-solid secondary battery (an all-solid lithium secondary battery) or a silver-ion-conducting all-solid secondary battery (an all-solid silver secondary battery). In this case, these all-solid secondary batteries can exhibit excellent charge-discharge properties.

In the above electrochemical device, it is preferred that the lithium-ion-conducting solid electrolyte contains at least one kind of a crystalline sulfide-based lithium-ion-conducting solid electrolyte and an amorphous sulfide-based lithium-ion-conducting solid electrolyte.

This makes it possible to obtain an electrochemical device having an electrode layer in which severe decrease of an electrochemical property is prevented. Therefore, a lithium-ion-conducting all-solid secondary battery (an all-solid lithium secondary battery) in which the electrochemical device is used can exhibit an excellent charge-discharge property.

In the above electrochemical device, it is preferred that the lithium-ion-conducting solid electrolyte contains at least one kind of a crystalline sulfide-based lithium-ion-conducting solid electrolyte and an amorphous sulfide-based lithium-ion-conducting solid electrolyte.

This makes it possible to obtain an electrochemical device having a solid electrolyte layer in which severe decrease of an electrochemical property is prevented. Therefore, a lithium-ion-conducting all-solid secondary battery (an all-solid lithium secondary battery) in which the electrochemical device is used can exhibit an excellent charge-discharge property.

It is preferred that the above electrochemical device is adapted to be used for constructing an electrochemical sensor, an electrochemical timer or an all-solid secondary battery.

The electrochemical device of the present invention may be used for constructing various kinds of apparatuses, but is preferably used for an electrochemical sensor, an electrochemical timer or an all-solid secondary battery. In this case, these apparatuses can exhibit excellent properties.

DESCRIPTION OF EXEMPLARY EMBODIMENTS

Figure 1:
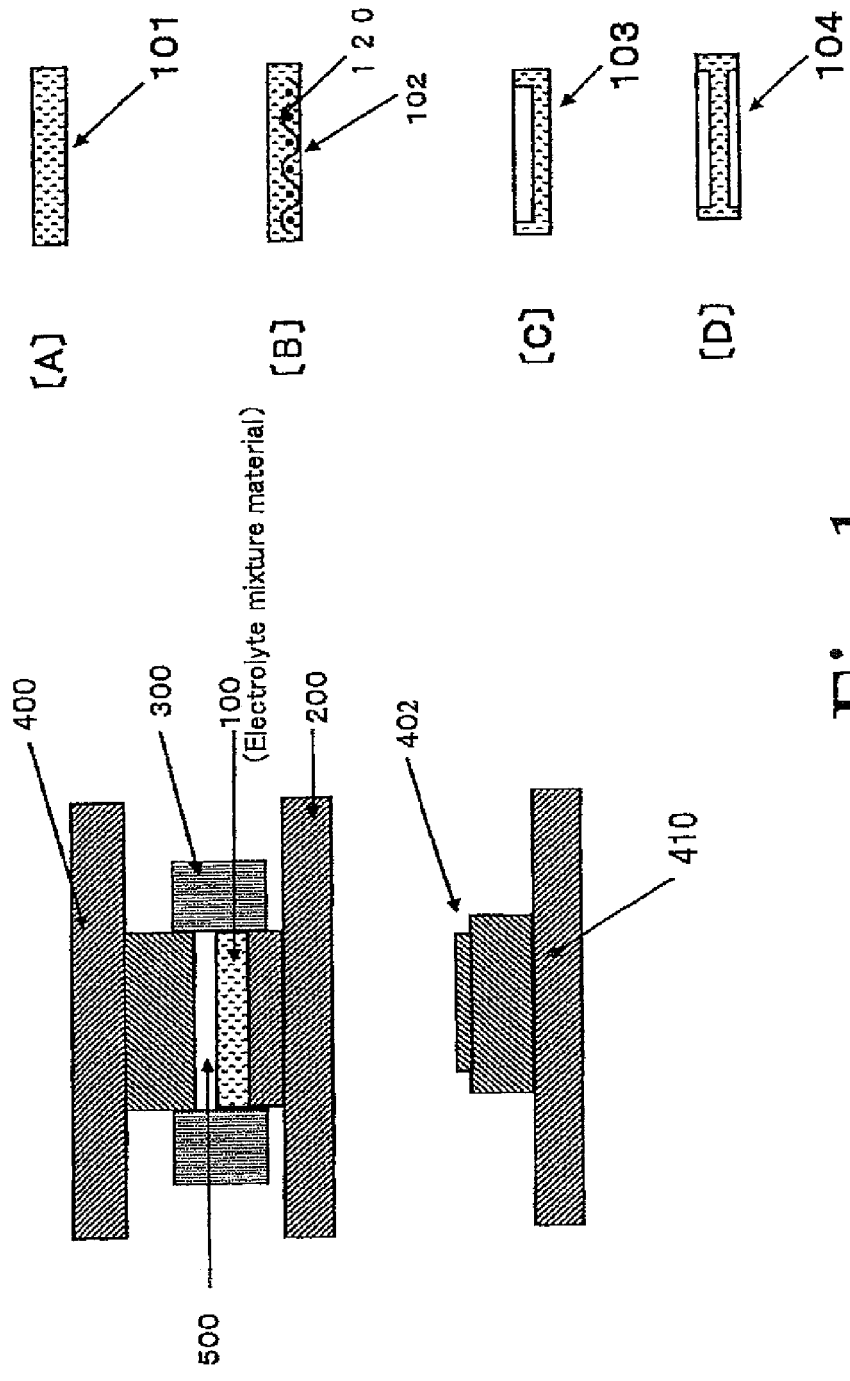
FIG. 1 is a vertical section view showing molds for forming a solid electrolyte layer of a battery device in the left side thereof, and a vertical section view showing structural examples of the solid electrolyte layer in the right side thereof.

Hereinafter, the electrochemical device according to the present invention will be described in detail with reference to preferred embodiments shown in the accompanying drawings.

The electrochemical device of the present invention includes a pair of electrode layers, and a solid electrolyte layer provided between the pair of electrode layers, wherein at least one layer of the electrode layers and the solid electrolyte layer is composed of first particles each providing a function of the at least one layer, second particles and a binder which is composed of an organic polymer and binds the first and second particles, and wherein the at least one layer is formed from a mixture material containing the first particles and binder particles, each of the binder particles including the second particle and the binder carried on at least a part of a surface thereof.

Hereinafter, description will be representatively offered regarding a case that the electrochemical device of the present invention (an all-solid electrochemical device) is used for constituting an all-solid secondary battery 1.

First, methods of forming the electrode layers and the solid electrolyte layer, and a method of manufacturing the electrochemical device will be described below. Specifically, as the method of forming the solid electrolyte layer, each of methods of forming a silver-ion-conducting solid electrolyte layer and a lithium-ion-conducting solid electrolyte layer will be described.

First Embodiment

<1> Formation of Solid Electrolyte Layer
<1-i> Preparation of Binder Solution

Here, description will be made on preparation of a binder solution (an organic polymer solution) to be used for producing the binder particles in a dried state, each of the binder particles including the second particle (particulate structure) and the binder carried on at least a part of a surface thereof.

The binder solution is used for producing the binder particles in a dried state. Each of the binder particles includes the second particle and the binder carried on at least a part of a surface thereof. The binder solution is obtained by dissolving the binder composed of the organic polymer in an organic solvent.

The organic polymer is not particularly limited to a specific type, but examples of the organic polymer include styrene-based thermoplastic elastomer such as styrene-butadiene-styrene block copolymer, styrene-isoprene-styrene block copolymer or styrene-ethylene-butylene-styrene block copolymer, polyolefin, polyamide, polyimide, hot-melt resin, and the like.

Among these materials, a material containing one or more of them as a major component thereof is preferably used as the organic polymer constituting the binder.

A desired amount of the binder is dissolved in the organic solvent to prepare the binder solution. The organic solvent is not particularly limited to a specific type. Examples of the organic solvent include: ketone-based solvent such as methylethylketone (MEK) or acetone; alcohol-based solvent such as ethylene glycol or diethylene glycol (DEG); aliphatic hydrocarbon-based solvent such as heptane or pentane; aromatic hydrocarbon-based solvent such as methylbenzene or xylene; amide-based solvent such as N,N-dimethylacetamide (DMA); sulfur compound-based solvent such as dimethyl sulfoxide (DMSO) or sulfolane; mixture solvent containing two or more of the above solvents; and the like.

An amount of the binder to be dissolved in the organic solvent to an amount of the organic solvent is preferably in the range of several to 50 wt %, and more preferably in the range of 5 to 30 wt %.

<1-ii> Production of Binder Particles for Solid Electrolyte Layer

Next, the binder solution prepared in the step <1-i> and the second particles to be carried the binder are mixed with each other sufficiently to obtain a mixture solution, the organic solvent is removed from the mixture solution so that it is dried to obtain a solid matter, and then the solid matter is crushed using a milling machine.

In this step, the second particles are crushed so as to have a desired particle shape and a desired particle size, to thereby obtain the binder particles. At this time, the second particles are downsized, and each of the downsized second particles carries the binder on a part of the surface thereof.

The crush can be performed using a milling machine such as a planet ball milling machine, a vibration ball milling machine or a jet milling machine.

In the case where the binder particles are produced, at least one kind selected from the group comprising electrochemically inactive insulating particles and electrolyte particles are used as the second particles on which the binder is to be carried.

As the electrochemically inactive insulating particles, particles made of metal oxide such as alumina, silica or zirconia can be preferably used. Further, as the electrolyte particles, electrolyte particles to be used for the solid electrolyte layer can be preferably used.

An amount of the binder carried on the second particles to an amount of an electrolyte mixture material to be used for forming the solid electrolyte layer is preferably in the range of 0.5 to 25 wt %, more preferably in the range of 0.5 to 20 wt %, even more preferably in the range of 1 to 15 wt %, and still more preferably in the range of 1 to 10 wt %. This makes it possible to prevent severe decrease of ion conductivity of the formed solid electrolyte layer (the obtained electrolyte molded body).

As described above, the method I (the immersion method) of immersing the second particles into the binder solution (that is, the method of mixing the second particles with the binder solution) is used, as the method of carrying the binder contained in the binder solution on the second particles.

In this regard, examples of an alternative method of carrying the binder on the second particles include a method II (an application method) of applying the binder solution on the surface of each second particle, a method III (a spray method) of spraying the binder solution on the surface of each second particle, and the like.

Further, in the case where the electrolyte particles are used as the second particles, for example, electrolyte particles composed of a lithium-ion-conducting solid electrolyte (a lithium-ion conductor) or electrolyte particles composed of a silver-ion-conducting solid electrolyte (a silver-ion conductor) can be preferably used.

Examples of the lithium-ion conducting solid electrolyte include a sulfide-based lithium-ion-conducting solid electrolyte such as a lithium-ion-conducting solid electrolyte glass (e.g., $Li_2S$—$SiS_2$, $Li_2S$—$SiS_2$—$LiI$, $Li_2S$—$SiS_2$—$LiBr$, $Li_2S$—$SiS_2$—$LiCl$, $Li_2S$—$SiS_2$—$B_2S_3$—$LiI$, $Li_2S$—$SiS_2$—$P_2S_5$—$LiI$, $Li_2S$—$B_2S_3$, $Li_2S$—$B_2S_3$—$LiI$, $Li_2S$—$P_2S_5$, $Li_2S$—$P_2S_5$—$LiI$, $Li_2S$—$P_2S_5$—$Z_mS_n$ (Z=Ge, Zn, Ga), $Li_2S$—$GeS_2$, $Li_2S$—$SiS_2$—$Li_3PO_4$ or $Li_2S$—$SiS_2$—$Li_xMO_y$ (M=P, Si, Ge, B, Al, Ga, In)), a crystalline lithium-ion-conducting solid electrolyte containing these components, a mixture of them, and the like.

It is preferred that the sulfide-based lithium-ion-conducting solid electrolyte contains at least one kind of a crystalline sulfide-based lithium-ion-conducting solid electrolyte and an amorphous sulfide-based lithium-ion-conducting solid electrolyte. The crystalline sulfide-based lithium-ion-conducting solid electrolyte has most superior lithium-ion conductivity and exhibits good moldability. Therefore, in the case where the battery device 2 of the all-solid secondary battery 1 is manufactured using the crystalline sulfide-based lithium-ion-conducting solid electrolyte, there is an advantage that an output current density thereof can become high.

On the other hand, since the amorphous sulfide-based lithium-ion-conducting solid electrolyte does not have anisotropic in ion conductivity, it can form a good ion-conducting path between the electrode active material. In addition, since the amorphous sulfide-based lithium-ion-conducting solid electrolyte exhibits high heat stability, in the case where an all-solid secondary battery 1 is manufactured using it, the all-solid secondary battery 1 can exhibit excellent storage stability.

In this regard, it is to be noted that in the case where the crystalline sulfide-based lithium-ion-conducting solid electrolyte and the amorphous sulfide-based lithium-ion-conducting solid electrolyte are used in combination, it becomes possible to enjoy all the advantages offered by them. However, when these sulfide-based lithium-ion-conducting solid electrolytes are used, it is preferred that the handling of the sulfide-based lithium-ion-conducting solid electrolytes is performed in a glove box into which a dried inert gas (e.g., an argon gas, a nitrogen gas or a green gas) is filled.

Examples of the silver-ion-conducting solid electrolyte include $AgI$—$Ag_nXO_4$ or $AgI$—$Ag_nX_2O_4$ (where the X represents W, Cr, Mo, P, V, Te, Se or As), $Ag_4RbI_5$ and the like, one or more kind of which may be used independently or in combination. Among them, it is preferred that iodinated silver tungstate ($Ag_6I_4WO_4$) exhibiting good thermal stability is used as the silver-ion-conducting solid electrolyte.

Use of this silver-ion-conducting solid electrolyte makes it possible to improve performance of the solid electrolyte layer and, eventually, a property (a charge-discharge property) of the all-solid secondary battery 1. Further, iodinated silver tungstate is stable in the air and easy to handle.

In this regard, it is to be noted that the above second particles (e.g., the above electrolyte particles) are further crushed and downsize so as to have an average particle size of several micrometers to several tens micrometers, and then the crushed particles are preferably used as the second particles.

<1-iii> Preparation of Electrolyte Mixture Material

In this step, using the binder particles produced in the step <1-ii>, an electrolyte mixture material for forming the solid electrolyte layer is prepared.

Specifically, first, a desired amount of the electrolyte particles (the ion-conducting solid electrolyte), i.e., the first particles each providing the function of the solid electrolyte layer is measured. Next, a desired amount of the binder particles produced in the step <1-ii> is added to the electrolyte particles, and then the electrolyte particles and the binder particles are mixed with each other and crushed to thereby obtain the electrolyte mixture material.

In this step, the electrolyte particles and the binder particles are downsized. An average particle size of the downsized electrolyte and binder particles is preferably in the range of 5 to 30 micrometers. The solid electrolyte layer obtained by press-forming such an electrolyte mixture material can have excellent mechanical strength, while preventing severe decrease of ion conductivity thereof.

For this reason, in the downsized electrolyte and binder particles, the average particle size of the above range is a preferable range for forming the solid electrolyte layer having an excellent property.

It is preferred that the amount of the binder to the amount of the electrolyte mixture material (the material for forming the solid electrolyte layer) is set to the range of 1 to 15 wt %. This makes it possible to obtain a solid electrolyte layer which is suitable to practical use.

Thereafter, the thus obtained electrolyte mixture material is dried sufficiently, and then is used for forming the solid electrolyte layer and the battery device (the electrochemical device) 2 of the all-solid secondary battery 1.

<1-iv> Formation of Solid Electrolyte Layer

Next, formation of the solid electrolyte layer using the electrolyte mixture material prepared in the step <1-iii> will be described. Hereinafter, description will be representatively offered regarding cases that a solid electrolyte layer having a disk shape and a solid electrolyte layer having a sheet shape are formed.

FIG. 1 is a vertical section view showing molds for forming a solid electrolyte layer of a battery device in the left side thereof, and a vertical section view showing structural examples of the solid electrolyte layer in the right side thereof.

Figure 2:
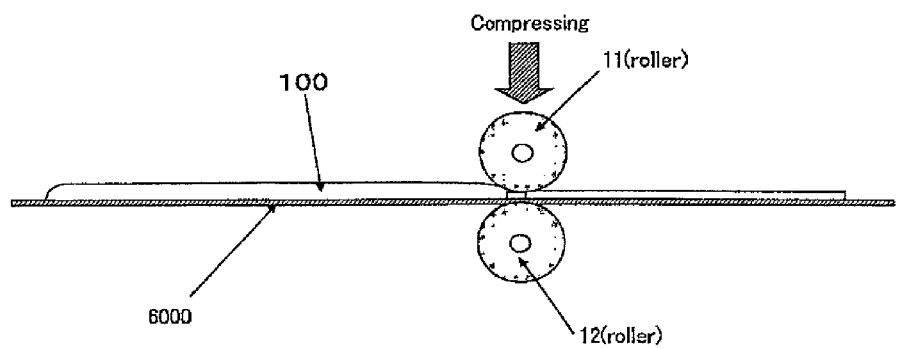
FIG. 2 is a schematic view showing an apparatus for forming a solid electrolyte layer and an electrode layer each having a sheet shape.

FIG. 2 is a schematic view showing an apparatus for forming a solid electrolyte layer and an electrode layer each having a sheet shape.

First, the case that the solid electrolyte layer 5 having the disk shape is formed will be described.

In this case, a female mold 300 having a cylindrical hole 500 is prepared as shown in FIG. 1. Subsequently, a desired amount of the electrolyte mixture material 100 prepared in the step <1-iii> is filled in the cylindrical hole 500 of the female mold 300 in a state that a lower male mold 200 is inserted into the cylindrical hole 500 and fitted to the female mold 300.

Then, after a top surface of a layer formed of the electrolyte mixture material 100 is leveled, the upper male mold 400 is inserted into the cylindrical hole 500, and then the lower male mold 200 and the upper male mold 400 are pressed using a press machine so that the electrolyte mixture material 100 is molded, to thereby obtain a solid electrolyte layer 5.

At this time, a molding pressure is preferably 3 ton/cm$^2$ or more, and more preferably 5 ton/cm$^2$ or more. By setting the molding pressure to the above range, the electrolyte mixture material 100 can be appropriately compressed. This makes it possible to maintain excellent ion conductivity of the obtained solid electrolyte layer.

In this regard, it is to be noted that if a female mold having a square hole is used instead of the female mold 300 having the cylindrical hole 500, it is possible to obtain a solid electrolyte layer having a square shape.

Through the above steps <1-i> to <1-iv>, it is possible to obtain a solid electrolyte layer 101 having a structure [A], among solid electrolyte layers 101 to 104 having structures [A] to [D] shown in the right side of FIG. 1.

Further, in order to improve mechanical strength of the solid electrolyte layer when folding it, the solid electrolyte layer may be formed so as to have a structure [B] (that is, a solid electrolyte layer 102). The solid electrolyte layer 102 may be formed as follows.

In this case, the top surface of the solid electrolyte mixture material 100 filled into the cylindrical hole 500 is leveled, an insulating mesh 120 cut so as to have a predetermined size is inserted into the cylindrical hole 500 and put on the top surface, the upper male mold 400 is inserted into the cylindrical hole 500, and then the lower male mold 200 and the upper male mold 400 are pressed using a press machine so that the electrolyte mixture material 100 is molded so as to bury the insulating mesh 120 therein, to thereby obtain a solid electrolyte layer 102.

In this regard, it is to be noted that examples of the insulating mesh 120 include a woven fabric and a nonwoven fabric each made of polyethylene, polypropylene, polycarbonate or polystyrene. In this way, it is possible to obtain a solid electrolyte layer 102 having the disk shape and a structure [B] in which the insulating mesh 120 is provided in the inside thereof.

Examples of a solid electrolyte layer having an alternative structure, which is used for constituting a secondary battery 2, include a solid electrolyte layer 103 having a structure [C] in which a recess portion is provided on one surface thereof or a solid electrolyte layer 104 having a structure [D] in which recess portions are provided on both surfaces thereof.

For example, the solid electrolyte layer 104 having the structure [D] can be formed by using two male molds 410 each having a protrusion portion 402, instead of the male molds 200 and 400 for the female mold 300 shown in FIG. 1.

First, a desired amount of the electrolyte mixture material 100 prepared in the step <1-iii> is filled in the cylindrical hole 500 of the female mold 300 in a state that one male mold 410 as a lower mold is inserted into the cylindrical hole 500 and fitted to the female mold 300.

Then, after a top surface of a layer formed of the electrolyte mixture material 100 is leveled, the other male mold 410 as the upper mold is inserted into the cylindrical hole 500, and then the two male molds 410 are pressed using a press machine so that the electrolyte mixture material 100 is molded, to thereby obtain the solid electrolyte layer 104 having the structure [D].

On the one hand, the solid electrolyte layer 103 in which the recess portion is provided on the one surface thereof can be formed by using the male mold 410 as the upper mold and the male mold 200 as the lower mold.

When these solid electrolyte layers 103 and 104 are formed, a molding pressure is preferably 3 ton/cm$^2$ or more, and more preferably 5 ton/cm$^2$ or more. By setting the molding pressure to the above range, the electrolyte mixture material 100 can be appropriately compressed. This makes it possible to maintain excellent ion conductivity of each of the obtained solid electrolyte layers 103 and 104.

In the case where each of the solid electrolyte layers 103 and 104 having such structures is provided between a pair of the electrode layers, at least one of the electrode layers is inserted into the recess portion of the solid electrolyte layer 103 or 104, having electrical insulation so as to cover a peripheral portion of the one electrode layer.

As a result, it is possible to easily prevent occurrence of electrical short-circuit between the electrode layers. Therefore, the solid electrolyte layers 103 and 104 can be preferably used for manufacturing the battery device 2 (or constituting the all-solid secondary battery 1).

Next, the solid electrolyte layer having the sheet shape can be formed as follows. First, the electrolyte mixture material 100 prepared in the step <1-iii> is applied onto a release paper 6000, and then it is uniformly leveled using a coater so as to become an average thickness of about 1 to 2 mm.

Thereafter, as shown in FIG. 2, the electrolyte mixture material 100 applied on the release paper 6000 is passed between rollers 11 and 12 whose distance is adjusted together with the release paper 6000, and they are compressed. In this way, in is possible to form a solid electrolyte layer having a sheet shape and a desired thickness.

Further, in order to improve mechanical strength of the solid electrolyte layer having the sheet shape when folding it, the solid electrolyte layer, in which the same insulating mesh (e.g., a woven fabric and a nonwoven fabric each made of polyethylene, polypropylene, polycarbonate or polystyrene) as the insulating mesh 120 is provided therein, is used.

Such a solid electrolyte layer having the sheet shape and the insulating mesh can be formed as follows. Namely, before the electrolyte mixture material 100 is compressed, the insulating mesh has been, in advance, laminated thereto, and then they are passed between the rollers 11 and 12 to obtain a solid electrolyte sheet.

Thereafter, the thus obtained solid electrolyte sheet is cut in a predetermined size, and then it is provided between the pair of the electrodes, to thereby obtain a battery device (that is, the electrochemical device of the present invention) 2 of an all-solid secondary battery 1.

<2> Formation of Electrode Layers

<2-i> Preparation of Binder Solution

A binder solution to be used for producing binder particles in a dried state is prepared in the same manner as in the above step <1-i>. Specifically, this binder solution is prepared using the same organic solvent and binder as those used in the above step <1-i>. Further, a composition of the binder solution to be prepared in the step <2-i> makes equal to that of the binder solution prepared in the above step <1-i>.

<2-ii> Production of Binder Particles for Electrode Layers

Next, the binder solution prepared in the step <2-i>, in which the binder is dissolved in the organic solvent, and the second particles to be carried the binder are mixed with each other sufficiently to obtain a mixture solution, the organic solvent is removed from the mixture solution so that it is dried to obtain a solid matter, and then the solid matter is crushed using a milling machine.

In this step, the second particles are crushed so as to have a desired particle shape and a desired particle size, to thereby obtain the binder particles. At this time, the second particles are downsized, and each of the downsized second particles carries the binder on a part of the surface thereof.

As the second particles to be used for producing the binder particles, it is possible to use electrode active material particles or electron-conducting particles, in addition to the electrochemically inactive insulating and electrolyte particles used for producing the binder particles for the solid electrolyte layer in the step <1-ii>.

In the case where at least one of electrode layers of a battery device 2, which is one example of electrochemical devices, is formed using the electrode active material particles or the electron-conducting particles as the second particles, it is possible to reduce a charge-discharge capacity and internal resistance of the battery device 2. Therefore, these particles are especially preferably used as the second particles.

An amount of the binder carried on the second particles to an amount of an electrode mixture material to be used for forming the electrode layer is preferably in the range of 0.5 to 25 wt %, more preferably in the range of 0.5 to 20 wt %, even more preferably in the range of 1 to 15 wt %, and still more preferably in the range of 1 to 10 wt %. This makes it possible to prevent severe decrease of electric resistance of the formed electrode layer (the obtained electrode molded body).

As described above, as the second particles on which the binder is to be carried, at least one kind selected from the group comprising the electrode active material particles, the electrolyte particles, the electron-conducting particles (the electrochemically inactive conducting particles) and the insulating particles (the electrochemically inactive insulating particles) can be used. These particles are used in manufacturing various kinds of the electrochemical devices.

In the case where a battery device of a silver-ion-conducting all-solid secondary battery is constituted as the electrochemical device, examples of an electrode active material to be used for forming the electrode layers include δ-type silver vanadate ($\delta$-$Ag_{0.7}V_2O_5$), metallic silver (Ag), silver chromate ($Ag_2Cr_2O_4$), and the like, one or more of which may be used independently or in combination. Among them, it is desirable to use the δ-type silver vanadate (particularly, $\delta$-$Ag_{0.7}V_2O_5$) as the electrode active material.

Use of this compound makes it possible to improve s property of each of the electrode layers (the cathode and anode layers). As a result, it is possible to enhance a property (a charge-discharge property) of the silver-ion-conducting all-solid secondary battery. Moreover, the δ-type silver vanadate is less environmentally detrimental, more stable in the air and easier to handle than the silver chromate.

In the case where a battery device of a lithium-ion-conducting all-solid secondary battery is constituted as the electrochemical device, examples of a cathode active material constituting the second particles to be used for forming the cathode layer include: transition metal oxide materials such as lithium cobaltate ($Li_xCoO_2$), lithium nickelate ($Li_x$—$NiO_2$), lithium nickel cobaltate ($LiCo_{0.3}Ni_{0.7}O_2$), lithium manganate ($LiMn_2O_4$), lithium titanate ($Li_{4/3}Ti_{5/3}O_4$) lithium manganate compound ($LiM_yMn_{2-y}O_4$, where the M is Cr, Co or Ni), lithium iron phosphate and olivine compound, which is one kind of lithium iron phosphate compound ($Li_{1-x}FePO_4$ and $Li_{1-x}Fe_{0.5}Nn_{0.5}PO_4$); sulfide-based chalcogen compounds such as $TiS_2$, $VS_2$, FeS and $M.MoS_8$ (where the M is a transition metal such as Li, Ti, Cu, Sb, Sn, Pb or Ni); and lithium metal oxides containing metal oxides such as $TiO_2$, $Cr_3O_8$, $V_2O_5$, $MnO_2$ and $CoO_2$ as their skeleton; and the like, one or more of which may be used independently or in combination.

On the other hand, examples of an anode active material constituting the second particles to be used for forming the anode layer include: metallic materials such as indium, tin, zinc, aluminum, silicon and germanium, intermetallic alloys of these metallic materials, metallic oxides of these metallic materials, and the like, one or more of which may be used independently or in combination.

In the case where the electrolyte particles are used as the second particles on which the binder is to be carried, examples of a solid electrolyte constituting them include: the silver-ion-conducting solid electrolyte (the silver-ion conductor), described in the step <1-i>, such as the AgI—$Ag_nXO_4$ or AgI—$Ag_nX_2O_4$ (where the X represents W, Cr, Mo, P, V, Te, Se or As) or the $Ag_4RbI_5$; the lithium-ion-conducting solid electrolyte (the lithium-ion conductor), described in the step <1-i>, such as the lithium-ion conducting solid electrolyte glass (e.g., $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$B_2S_3$—LiI, $Li_2S$—$P_2S_5$, $Li_2S$—$P_2S_5$—LiI, $Li_2S$—$P_2S_5$—$Z_mS_nGe$, Zn, Ga), $Li_2S$—$GeS_2$, $Li_2S$—$SiS_2$—$Li_3PO_4$ or $Li_2S$—$SiS_2$—$Li_xMO_y$ (M=P, Si, Ge, B, Al, Ga, In)), the crystalline lithium-ion-conducting solid electrolyte containing these components or the mixture of them; and the like.

Further, in the case where the electron-conducting particles are used as the second particles on which the binder is to be carried, examples of a conducting material constituting them include titanium, vanadium, iron, manganese, nickel, copper, aluminum, silicon, zinc, gallium, germanium, silver, indium, tin, antimony, and the like. These conducting materials can be appropriately selected in view of an electrochemical reaction in the all-solid secondary battery to be manufactured.

Furthermore, in the case where the insulating particles are used as the second particles on which the binder is to be carried, examples of an insulating material constituting them include an insulating metallic oxide such as alumina, silica or zirconia, and the like.

<2-iii> Preparation of Electrode Mixture Material

It general, an electrode layer of an all-solid secondary battery may be formed by an electrode mixture material containing electrolyte particles (ion-conducting electrolyte particles), electrode active material particles and, if need, electron-conducting particles such as carbon particles.

Further, the electrode layer may be formed by preparing a slurry in which the electrode mixture material is mixed with a binder solution (an organic polymer solution) containing a binder, applying and drying the slurry to obtain a solid matter, compressing and rolling the solid matter, if need, to obtain an electrode sheet, and then cutting the electrode sheet to a required shape and a required size.

However, in the present invention, the electrode layer is formed using an electrode mixture material containing the binder particles produced in the step <2-ii> and electrode active material particles, i.e., the first particles providing the function of the electrode layer.

Specifically, first, desired amounts of the electrolyte particles (the ion-conducting electrolyte particles) and electrode active material particles are measured. Next, a desired amount of the binder particles produced in the step <2-ii> is added to the same, and then the electrolyte particles, the electrode active material particles and the binder particles are mixed with each other and crushed to thereby obtain the electrode mixture material. In this step, the electrolyte particles, the electrode active material particles and the binder particles are downsized.

In this case, a mixing ratio (a mole ratio) of an amount of the electrolyte particles to an amount of the electrode active material particles is preferably in the range of 1:9 to 4:6. By setting the mixing ratio to the above range, it is possible to enhance a battery capacity of an all-solid secondary battery 1 to be manufactured.

Further, the mixing ratio of the amount of the electrolyte particles to the amount of the electrode active material particles is more preferably in the range of 1:9 to 5:5. This makes it possible to obtain an all-solid secondary battery 1 having practical capacity.

Furthermore, the amount of the binder (the organic polymer) to the amount of the electrode mixture material (the material for forming the electrode layer) is particularly preferably in the range of 1 to 25 wt %. This makes it possible to obtain an electrode layer having a practical property in electrical conductivity.

An average particle size of the downsized electrolyte, electrode active material and binder particles is preferably in the range of 5 to 30 micrometers. The electrode layer obtained by press-forming such an electrode mixture material can have excellent mechanical strength, while preventing severe increase of electrical resistance thereof.

For this reason, in the downsized electrolyte, electrode active material and binder particles, the average particle size of the above range is a preferable range for forming the electrode layer having an excellent property.

Thereafter, the thus obtained electrode mixture material is dried sufficiently, and then used for forming the electrode layer.

In the case where the above electrode layer is used as a cathode layer or an anode layer, a combination of a cathode active material (that is, the electrode active material to be used for forming the cathode layer) and an anode active material (that is, the electrode active material to be used for forming the anode layer) is not particularly limited to a specific combination.

Among materials having different electrochemical reaction potentials, a material having electropositive potential is selected as the cathode active material, whereas a material having electronegative potential is selected as the anode active material, and these materials are used in combination. This makes it possible to obtain an all-solid secondary battery 1 having an arbitrary discharge voltage.

In the case where a battery device of a lithium-ion-conducting all-solid secondary battery is constituted as the electrochemical device, examples of the cathode active material constituting the first particles to be used for forming the cathode layer include: transition metal oxide materials such as lithium cobaltate ($Li_xCoO_2$), lithium nickelate ($Li_xNiO_2$), lithium nickel cobaltate ($LiCo_{0.3}Ni_{0.7}O_2$), lithium manganate ($LiMn_2O_4$), lithium titanate ($Li_{4/3}Ti_{5/3}O_4$), lithium manganate compound ($LiM_yMn_{2-y}O_4$, where the M is Cr, Co or Ni), lithium iron phosphate and olivine compound, which is one kind of lithium iron phosphate compound ($Li_{1-x}FePO_4$ and $Li_{1-x}Fe_{0.5}Mn_{0.5}PO_4$); sulfide-based chalcogen compound such as $TiS_2$, $VS_2$, FeS and $M.MoS_8$ (where the M is a transition metal such as Li, Ti, Cu, Sb, Sn, Pb or Ni); and lithium metal oxides containing metal oxides such as $TiO_2$, $Cr_3O_8$, $V_2O_5$, $MnO_2$ and $CoO_2$ as their skeleton; and the like, one or more of which may be used independently or in combination.

On the other hand, examples of the anode active material constituting the first particles to be used for forming the anode layer include: metallic materials such as indium, tin, zinc, aluminum, silicon and germanium, intermetallic alloys of these metallic materials, and metallic oxides of these metallic materials, and the like, one or more of which may be used independently or in combination.

Further, in the case where a battery device of a silver-ion-conducting all-solid secondary battery is constituted as the electrochemical device, examples of the electrode active material constituting the first particles to be used for forming the electrode layers (the cathode and anode layers) include δ-type silver vanadate (δ-$Ag_{0.7}V_2O_5$), metallic silver (Ag), silver chromate ($Ag_2Cr_2O_4$), and the like, one or more of which may be used independently or in combination. Among them, it is desirable to use the δ-type silver vanadate (particularly, δ-$Ag_{0.7}V_2O_5$) as the electrode active material.

Use of this compound makes it possible to improve a property of each of the electrode layers (the cathode and anode layers). As a result, it is possible to enhance a property (a charge-discharge property) of the silver-ion-conducting all-solid secondary battery. Moreover, the δ-type silver vanadate is less environmentally detrimental, more stable in the air and easier to handle than silver chromate.

Examples of the solid electrolyte constituting the electrolyte particles contained in the electrode layers (the cathode and anode layers) include: the silver-ion-conducting solid electrolyte, described above, such as the $AgI$—$Ag_nXO_4$ or the $AgI$—$Ag_nX_2O_4$ (where the X represents W, Cr, Mo, P, V, Te, Se or As) or the $Ag_4RbI_5$; the lithium-ion-conducting solid electrolyte such as the lithium-ion conducting solid electrolyte glass (e.g., $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$B_2S_3$—LiI, $Li_2S$—$P_2S_5$, $Li_2S$—$P_2S_5$—LiI, $Li_2S$—$P_2S_5$—$Z_mS_n$ (Z=Ge, Zn, Ga), $Li_2S$—$GeS_2$, $Li_2S$—$SiS_2$—$Li_3PO_4$, and $Li_2S$—$SiS_2$—$Li_xMO_y$ (M=P, Si, Ge, B, Al, Ga, In)), the crystalline lithium-ion-conducting solid electrolyte containing these components or the mixture of them; and the like.

<2-iv> Formation of Electrode Layer

Next, formation of the electrode layer using the electrode mixture material prepared in the step <2-iii> will be described. Hereinafter, description will be representatively offered regarding cases that an electrode layer having a disk shape and an electrode layer having a sheet shape are formed.

Figure 3:
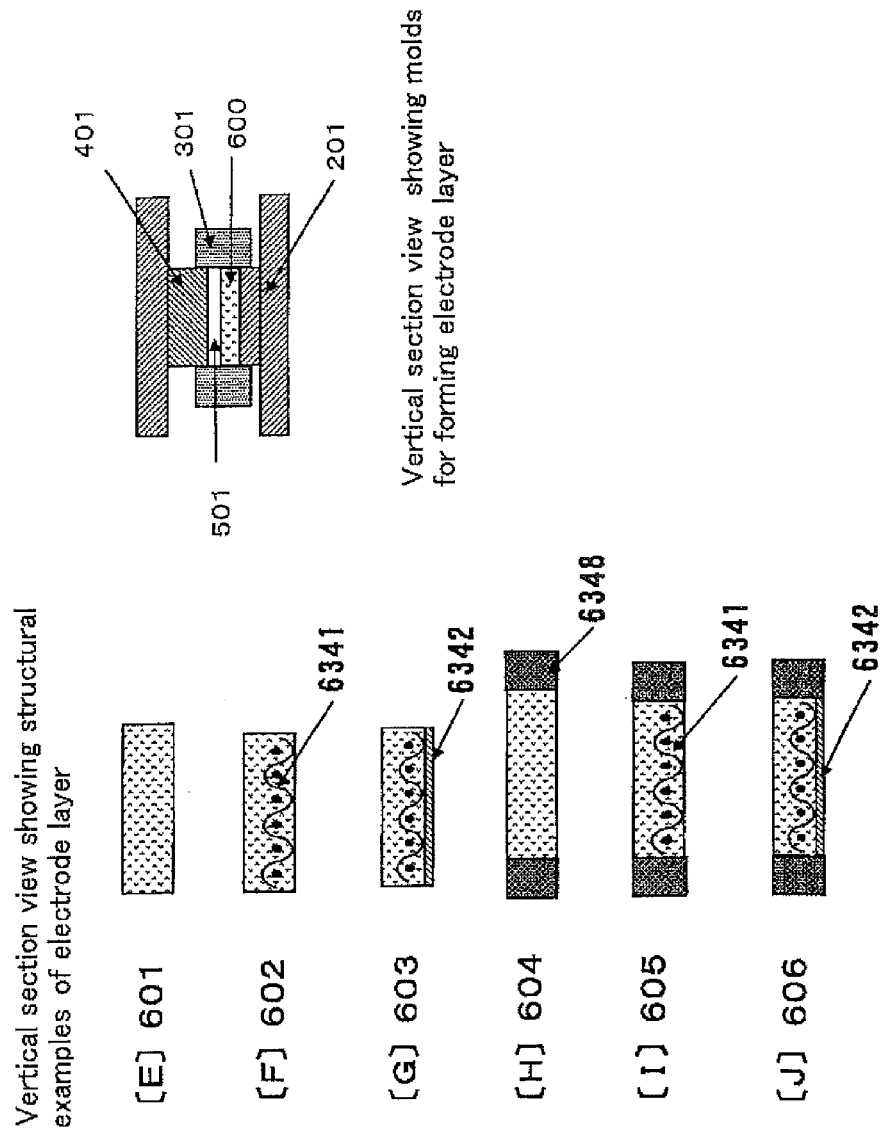
FIG. 3 is a vertical section view showing structural examples of an electrode layer of a battery device in the left side thereof, and a vertical section view showing molds for forming the electrode layer in the left side thereof.

Molds shown in the right side of FIG. 3 can be used for forming these electrode layers, these molds have the same structures as those of the molds used for forming the solid electrolyte layer shown in FIG. 1.

In this regard, it is preferred that the female mold having a cylindrical hole with an inside diameter smaller than that of the cylindrical hole 500 of the female mold 300 shown in FIG. 1 is used, if need. In an all-solid secondary battery having a cathode layer and an anode layer each formed using such molds, it is possible to reliably prevent occurrence of short-circuit between the cathode layer and the anode layer.

In this case, a female mold 301 having a cylindrical hole 501 is prepared as shown in FIG. 3. Subsequently, a desired amount of the electrode mixture material 600 prepared in the step <2-iii> is filled in the cylindrical hole 501 of the female mold 301 in a state that a lower male mold 201 is inserted into the cylindrical hole 501 and fitted to the female mold 301.

Then, after a top surface of a layer formed of the electrode mixture material 600 is leveled, the upper male mold 401 is inserted into the cylindrical hole 501, and then the lower male mold 201 and the upper male mold 401 are pressed using a press machine so that the electrode mixture material 600 is molded, to thereby obtain an electrode layer.

Through the above steps <2-i> to <2-iv>, it is possible to obtain an electrode layer 601 having a disk shape and a structure [E] shown in the left side of FIG. 3.

Further, in order to reduce electrical resistance of the electrode layer or improve mechanical strength thereof when folding it, the electrode layer may be formed so as to have a structure [F] (that is, an electrode layer 602). The electrode layer 602 may be formed as follows.

In this case, the top surface of the layer formed of the electrode mixture material 600 filled into the cylindrical hole 501 is leveled, a collector formed from a conducting mesh member 6341 cut so as to have a predetermined size is inserted into the cylindrical hole 501 and put on the top surface, and then the lower male mold 201 and the upper male mold 401 are pressed using a press machine so that the electrode mixture material 600 is molded so as to bury the conducting mesh member 6341 therein, to thereby obtain the electrode layer 602.

At this time, a molding pressure is preferably 3 ton/cm$^2$ or more, and more preferably 5 ton/cm$^2$ or more. By setting the molding pressure to the above range, the electrode mixture material 600 can be appropriately compressed, and also be reliably filled into through-holes of the collector formed from the conducting mesh member 6341 if it is used.

Further, as shown in the left side of FIG. 3, electrode layers 603 to 606 having structures [G] to [J] can be formed. For example, the electrode layer 603 having the structure [G] can be formed in the same manner as in the electrode layer 602 having the structures [F], except that a collector, in which an electrode lead board 6342 formed from a conducting thin film is joined (united) to the conducting mesh member 6341 used in the structure [F] using a spot welding, is used.

Furthermore, each of the electrode layers 604 to 606 having the structures [H] to [J] is an electrode layer including each of the structures [E] to [G], and a flame member (an electrode flame) 6348 provided along a periphery portion thereof.

This flame member serves as a restrictor that restricts a volume change of the electrode layer which would be generated due to a change in crystal structures of the electrode active material when an electrochemical reaction occur in the electrode layer. Therefore, by providing the flame member 6348 in the electrode layer, it is possible to improve mechanical strength thereof.

As the conducting mesh member 6341, a woven mesh made of an electron-conducting metallic material such as Cu, Ni, Ti or SUS or an expanded mesh utilizing a conducting thin film can be used. Further, the collector can be formed from a conducting thin film having a plurality of recess portions, into which the electrode mixture material is filled, provided on a surface thereof, instead of the conducting mesh member 6341.

In this regard, the conducting mesh member 6341 can be formed by weaving a plurality of thin lines made of the electron-conducting metallic material. Further, the recess portions provided on the surface of the conducting thin film can be formed by compressing it using a press machine.

Further, as long as such a collector has conductivity at least on a surface thereof, it may be a member made of a conducting material in its entirety, or a member including a core whose surface is coated with a conducting layer.

Examples of the core include: a woven fabric and a nonwoven fabric each made of a hard resin material such as polyethylene, polypropylene, polycarbonate or polystyrene; a insulating thin film made of a ceramic such as alumina or glass and having the recess portions on the surface thereof.

An occupation percentage of the through-holes or the recess portions of the collector in a plan view is preferably in the range of about 25 to 90%, and more preferably in the range of about 50 to 85%, although it may slightly vary depending on the constituent material and intended use of the collector.

Further, an average thickness of the collector is preferably in the range of about 50 to 400 μm, and more preferably in the range of about 100 to 200 μm, although it may be slightly changed depending on the constituent material and intended use of the collector.

Next, the electrode layer having the sheet shape can be formed using the apparatus shown in FIG. 2, that is, the same apparatus as one used for forming the solid electrolyte layer having the sheet shape.

First, the electrode mixture material 600 produced in the step <2-iii> is applied onto a release paper 6000, and then it is uniformly leveled using a coater so as to become an average thickness of about 1 to 2 mm.

Thereafter, the electrode mixture material 600 provided on the release paper 6000 is passed between rollers 11 and 12 whose distance is adjusted together with the release paper 6000, and they are compressed. In this way, it is possible to form an electrode layer having a sheet shape and a desired thickness.

Further, in order to improve mechanical strength of the electrode layer having the sheet shape when folding it and to reduce electrical resistance thereof, the electrode layer, in which a conducting mesh member such as a metallic mesh or a metallic expanded mesh is provided, is used.

Such an electrode layer having the sheet shape can be formed as follows. Namely, before the electrode mixture material 600 is compressed, the conducting mesh member (the collector) has been, in advance, laminated thereto, and then they are passed between the rollers 11 and 12 to obtain a electrode sheet. Thereafter, the thus obtained electrode sheet is cut in a predetermined size, to thereby obtain an electrode layer.

<3> Manufacture of Battery Device

The battery device 2 of the all-solid secondary battery 1 has a basic structure including a pair of a cathode layer and an anode layer, and a solid electrolyte layer provided between the cathode layer and the anode layer.

The battery device 2 is manufactured by forming the solid electrolyte layer through the above steps <1-i> to <1-iv> and the cathode and anode layers through the above steps <2-i> to <2-iv>, respectively, and then pressing the cathode and anode layers and the solid electrolyte layer provided (interposed) therebetween to thereby join them together.

At this time, although all of the solid electrolyte layers 101 to 104 having the structures [A] to [D] shown in FIG. 1 can be used as the solid electrolyte layer, it is preferred that the solid electrolyte layers 103 and 104 having the structures [C] and [D] are used.

This makes it possible to prevent occurrence of short-circuit which would be easily generated between the cathode layer and the anode layer when the battery device 2 of the all-solid secondary battery 1 is in use.

On the other hand, although all of the electrode layers 601 to 606 having the structures [E] to [J] shown in FIG. 3 can be used as each of the cathode layer and the anode layer, it is preferred that the electrode layers 603 and 604 having the structures [G] and [H] are used.

This makes it possible to improve mechanical strength of each of the cathode layer and the anode layer against expansion and contraction of the electrode active material when the battery device 2 of the all-solid secondary battery 1 is in use (charge-discharge operation). As a result, it is possible to extend life in charge-discharge cycles of the battery device 2 (the all-solid secondary battery 1).

Figure 4:
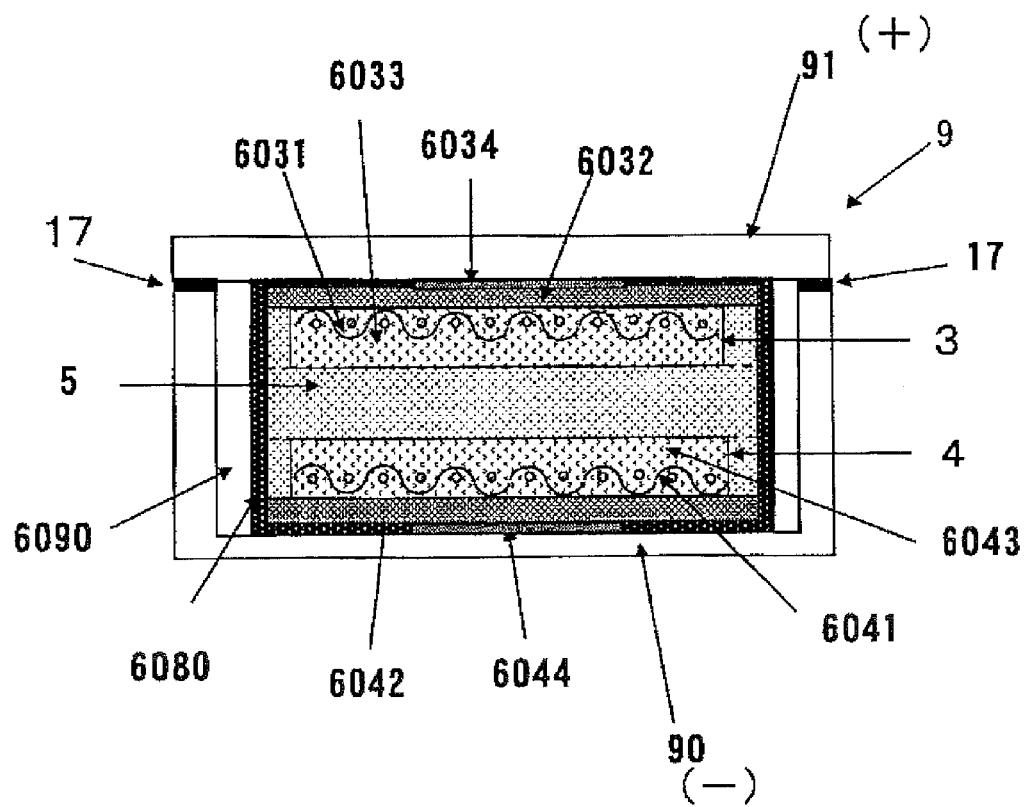
FIG. 4 is a vertical section view showing an all-solid secondary battery having a coin shape, in which the electrochemical device according to the present invention is used.
Figure 5:
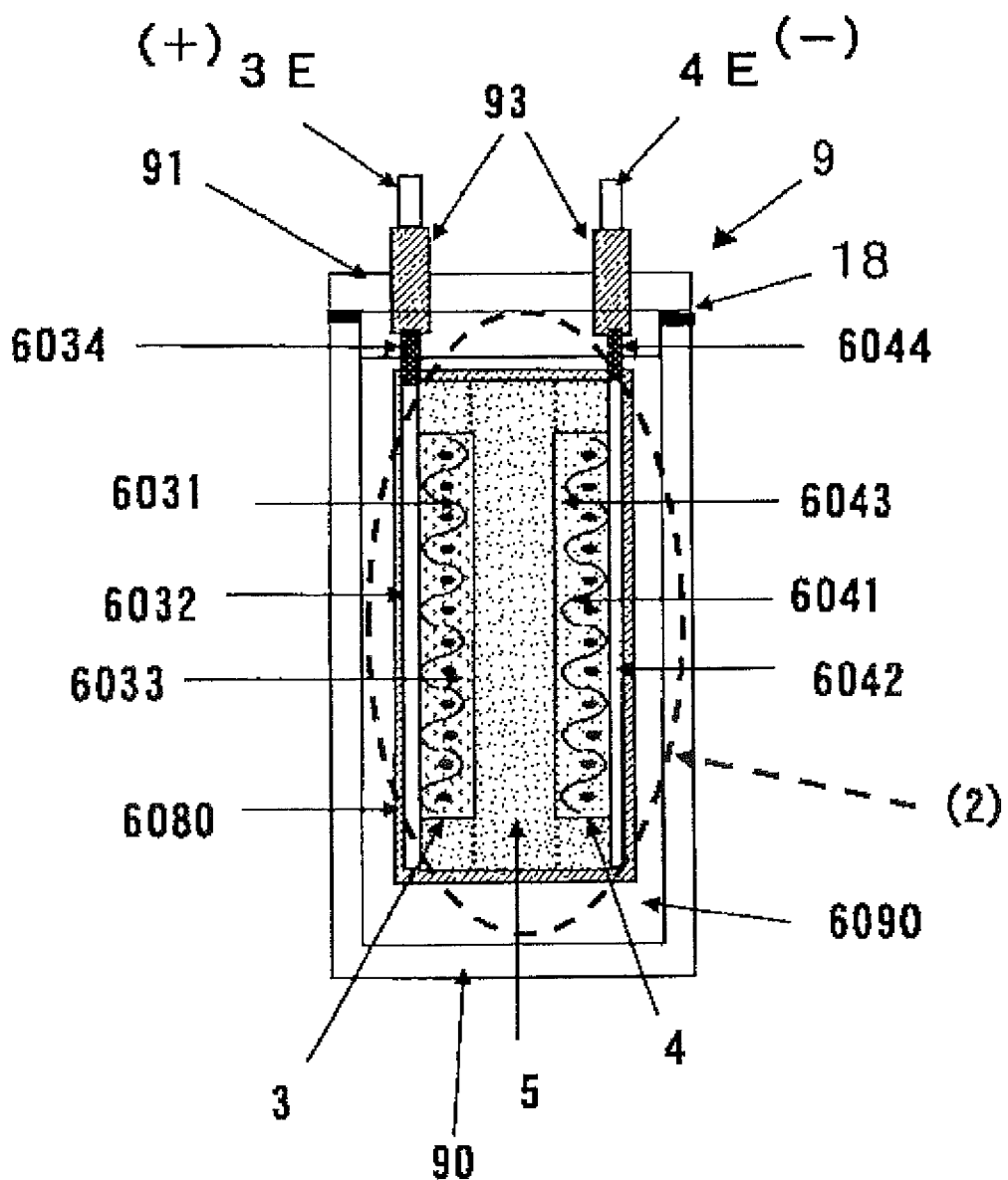
FIG. 5 is a vertical section view showing an all-solid secondary battery having a square shape, in which the electrochemical device according to the present invention is used.

FIGS. 4 and 5 are, respectively, a vertical section view showing an all-solid secondary battery having a coin shape and a vertical section view showing an all-solid secondary battery having a square shape.

Hereinafter, description will be made on structures and methods of manufacturing these all-solid secondary batteries 1. The all-solid secondary battery 1 shown in FIG. 4 has a coin-shaped structure, and the all-solid secondary battery 1 shown in FIG. 5 has a square-shaped structure.

In FIG. 4, numeral references 3 and 4, respectively, show the cathode layer and the anode layer, and a numeral reference 5 shows the solid electrolyte layer.

Numeral references 6031, 6032, 6033 and 6034, respectively, show a conducting expanded mesh used as a cathode collector, a cathode lead board, a cathode mixture material and a cathode extraction lead.

Further, numeral references 6041, 6042, 6043 and 6044, respectively, show a conducting expanded mesh used as an anode collector, an anode lead board, an anode mixture material and an anode extraction lead.

Numerals 6080 and 6090, respectively, show a restrictor and a fixed portion. Numerals 90 and 91, respectively, show a container body of a coin type battery container which also serves as an anode terminal and a lid (a sealing plate) which also serves as a cathode terminal. A numeral reference 17 shows an insulating packing.

Further, the all-solid secondary battery having the square shape shown in FIG. 5 includes a cathode layer 3 having a square shape, an anode layer 4 having a square shape, and a solid electrolyte layer 5 having a square shape and provided therebetween. Numerals 3E and 4E, respectively, show a cathode terminal and an anode terminal.

These terminals 3E and 4E are secured to the lid 91 for the container body 90 through insulating tubes 93 in a liquid-tight state. Further, the lid 91 is fixed to the container body 90 through an adhesive agent, a packing agent or a weld metal.

Figure 6:
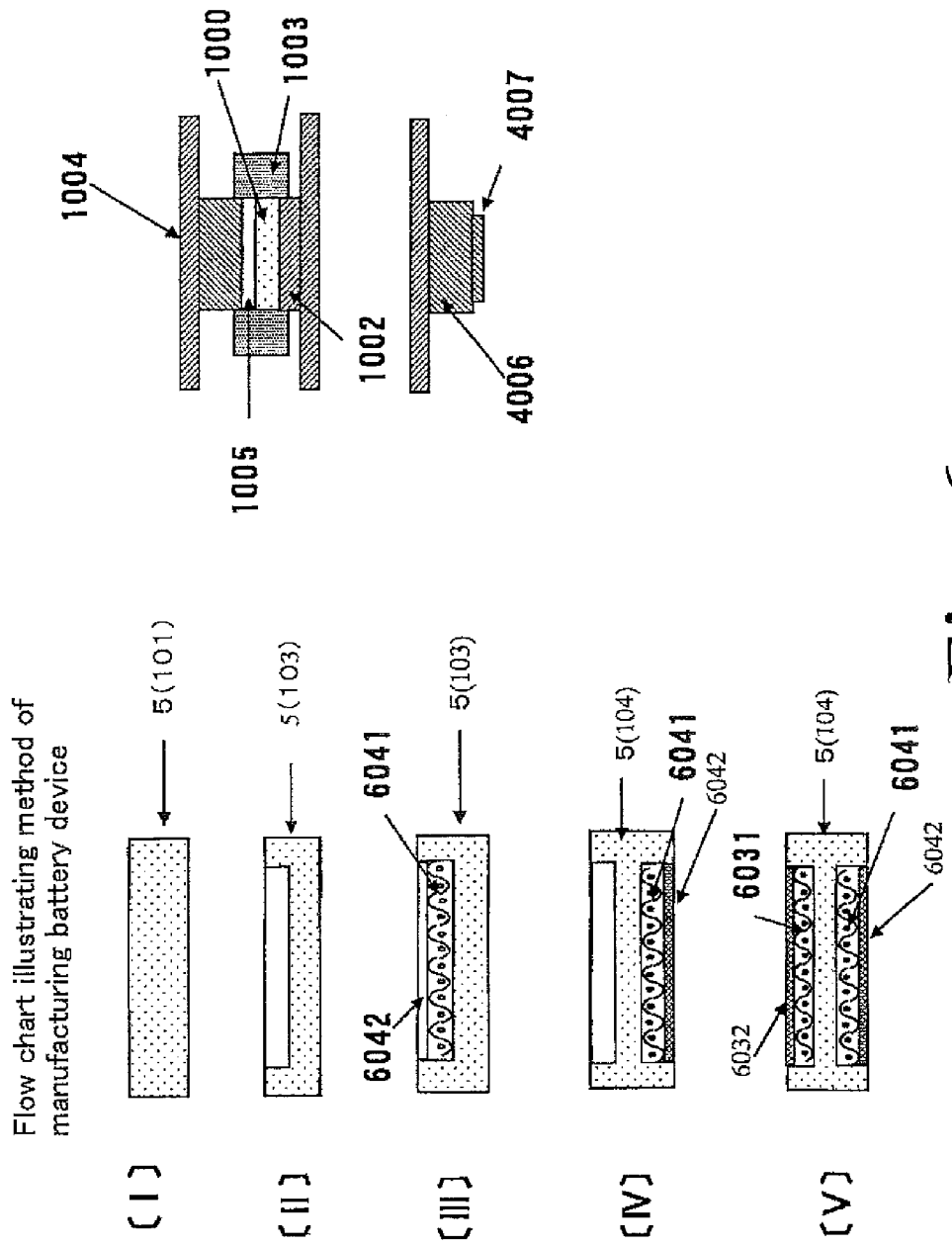
FIG. 6 is a flowchart illustrating a method of manufacturing the battery device of the all-solid secondary battery in the left side thereof, and a vertical section view showing molds for forming the solid electrolyte layer of the battery device in the right side thereof.
Figure 9:
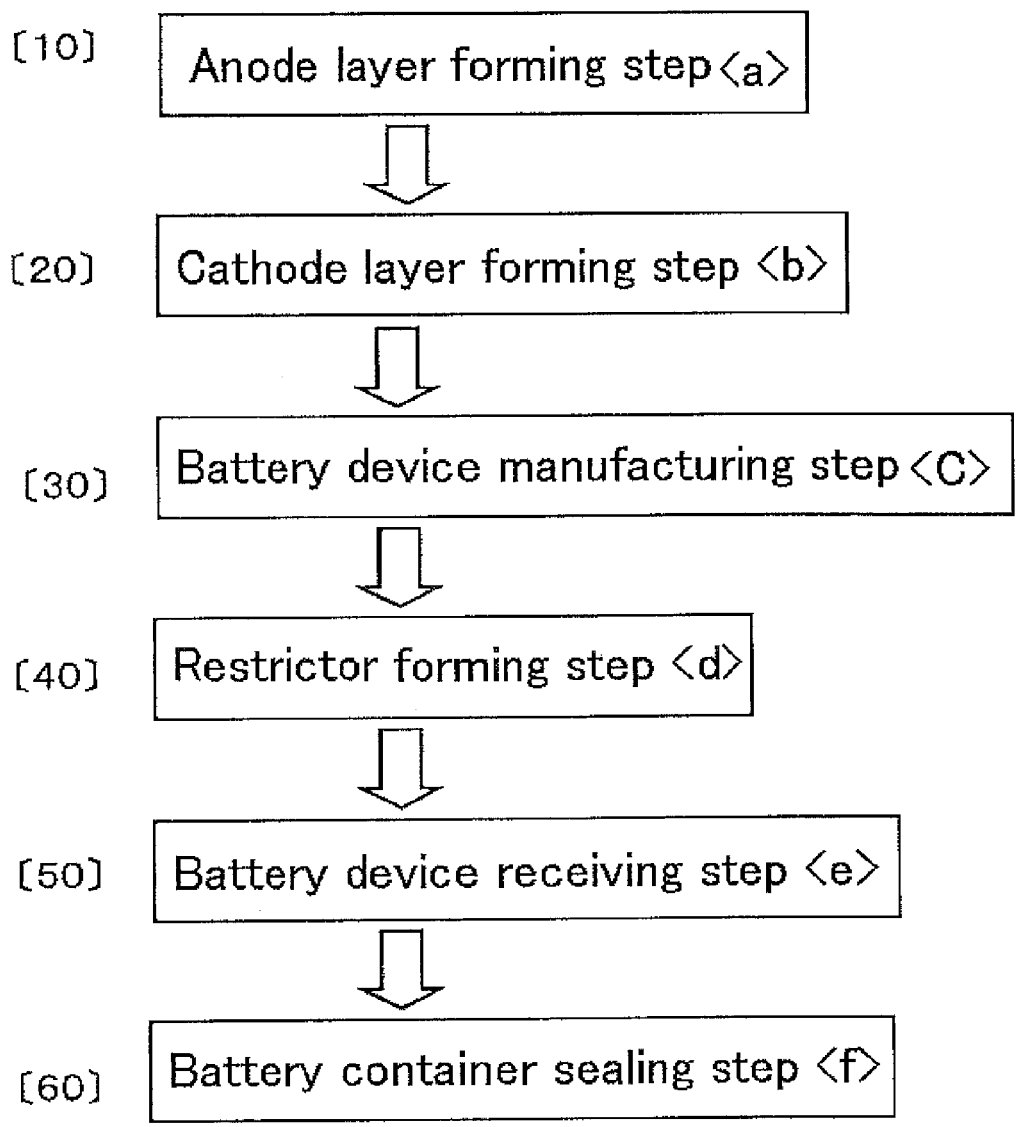
FIG. 9 is a flowchart illustrating a method of manufacturing the all-solid secondary battery.

FIG. 6 is a flowchart illustrating a method of manufacturing the battery device of the all-solid secondary battery in the left side thereof, and a vertical section view showing molds for forming the solid electrolyte layer of the battery device in the right side thereof. FIG. 9 is a flowchart illustrating a method of manufacturing the all-solid secondary battery.

The method of manufacturing the all-solid secondary battery shown in FIG. 9 includes: <a> an anode layer forming step 10 for forming the anode layer; <b> a cathode layer forming step 20 for forming the cathode layer; <c> a battery device manufacturing step 30 for manufacturing the battery device (the all-solid battery device) by forming the solid electrolyte layer and then joining the solid electrolyte layer and the thus formed anode and cathode layers together; <d> a restrictor forming step 40 for forming the restrictor so as to cover almost all of the battery device; <e> a battery device receiving step 50 for receiving the battery device with the restrictor into the container body; <f> a battery container sealing step 60 for sealing the battery container while extracting the anode and cathode layers of the battery device exteriorly.

Hereinafter, the respective steps will be described one by one.

<a> Anode Layer Forming Step 10

<a1> Before the anode layer is formed, first, an anode mixture material and a member which are necessary for forming the anode layer are prepared, respectively.

The anode mixture material is prepared by producing binder particles to be used for forming the anode layer according to the step <2-ii> using a binder solution prepared in the step <2-i>, and then mixing anode active material particles and electrolyte particles each prepared independently with the binder particles according to the step <2-iii>.

Namely, the anode mixture material contains the anode active material particles, the electrolyte particles and the binder particles to be used for forming the anode layer.

Specifically, the anode mixture material can be prepared by measuring required amounts of the anode active material particles, the electrolyte particles and the binder particles, and then mixing them with each other using a milling machine (a mixing machine) such as a planet ball milling machine.

A mixing ratio of an amount of the electrolyte particles to an amount of the anode active material particles is preferably in the range of 1:9 to 5:5. Further, an amount of the binder to an amount of the anode mixture material is preferably in the range of 0.5 to 25 wt %, and more preferably in the range of 1 to 10 wt %.

This makes it possible to maintain an ion-conducting path existing in the anode mixture material in a good state, while reducing internal resistance in the formed anode layer.

In the anode mixture material prepared in this way, it is possible to prevent contact of the anode active material particles with the binder solvated by the organic solvent. This makes it possible to reliably prevent sealing of gateways of ion-conducting channels (paths) of the anode active material particles by the binder in a polarized state.

<a2> Next, an anode collector to be used for burying in the anode layer is prepared.

A metallic expanded mesh having an occupation percentage of the through-holes of 75% has been, in advance, prepared by processing and cutting a copper foil having a thickness of 70 micrometers. Further, a copper foil having the same size as that of the metallic expanded mesh and a thickness of 50 micrometers is prepared as an anode lead board.

Next, the metallic expanded mesh and the anode lead board are bonded together at a plurality of points by a spot welding to thereby obtain the anode collector.

By forming an anode layer using such anode collector and anode mixture material, it is possible to preferably prevent enhancement of impedance in the formed anode layer. This makes it possible to prevent enhancement of internal resistance in a battery device with such an anode layer. As a result, a battery device having an excellent property can be obtained.

<a3> Next, molds to be used for forming the anode layer are prepared as shown in the right side of FIG. 3. Subsequently, the anode mixture material (the electrode mixture material 600) is filled in a cylindrical hole 501 of a female mold 301 in a state that a lower male mold 201 is inserted into the cylindrical hole 501.

Then, after a top surface of a layer formed of the anode mixture material is leveled, the anode collector is inserted into the cylindrical hole 501 so that the metallic expanded mesh is positioned on the side of the anode mixture material.

Thereafter, the upper male mold 401 is inserted into the cylindrical hole 501, and then the lower male mold 201 and the upper male mold 401 are pressed using a press machine so that the anode mixture material is molded.

In this way, it is possible to obtain a anode layer having a disk shape and a structure [E] (that is, an electrode layer 603 having the disk shape) in which the anode mixture material is filled into the through-holes of the metallic expanded mesh of the anode collector by compression.

At this time, a molding pressure is preferably 3 ton/cm$^2$ or more, and more preferably 5 ton/cm$^2$ or more. By setting the molding pressure to the above range, the anode mixture material can be appropriately compressed, and also be filled into the through-holes of the metallic expanded mesh of the anode collector reliably.

In this regard, it is to be noted that a constituent material of each of the molds used for forming the anode layer is not limited to a metallic material, and may be a resin material or a ceramic material.

The thus obtained anode layer is removed from the cylindrical hole 501 of the female mold 301, and is used for manufacturing the battery device of the all-solid secondary battery.

<b> Cathode Layer Forming Step 20

In this step, the cathode layer is formed in the same manner as in the above step <a>, that is, the anode layer forming step 10, except that a cathode active material particles are used instead of the anode active material particles as the electrode active material particles.

Namely, the cathode active material particles are prepared instead of the anode active material particles, and the cathode layer is formed in the same manner as the above anode layer using a cathode mixture material containing the cathode active material particles.

<c> Battery Device Manufacturing Step 30

<c1> First, according to the step <2-iii>, an electrolyte mixture material is prepared by mixing electrolyte particles with the binder particles to be used for forming the solid electrolyte layer, which the binder particles are prepared in the step <1-ii>.

<c2> Next, as molds to be used for manufacturing the battery device, molds shown in the left side of FIG. 6 are prepared. In this embodiment, in order to form a solid electrolyte layer having two recess portions, into each of which the cathode layer or the anode layer is inserted, on both of surfaces thereof, two male molds 4006 each having a protrusion portion 4007 are used as lower and upper male molds.

In this regard, it is to be noted that the male molds 4006 each having the protrusion portion 4007 with an exterior shape equal to or slightly larger than that of the cathode and anode layers are used.

<c3> Next, the electrolyte mixture material 1000 is filled in a cylindrical hole 1005 of a female mold 1003 in a state that one of the two male molds 4006 is inserted into the cylindrical hole 1005.

Then, after a top surface of a layer formed of the electrolyte mixture material 1000 is leveled, the other male mold 4006 is inserted into the cylindrical hole 1005 and the two male molds 4006 are lightly pressed so that the electrolyte mixture material 1000 is molded, to thereby obtain a solid electrolyte layer having a structure [D] shown in FIG. 1.

Thereafter, the other male mold 4006 is removed from the cylindrical hole 1005, and the cathode layer formed in the step <b>, in which the cathode collector obtained by joining the cathode lead board and the metallic expanded mesh together is buried, is inserted into one of the recess portions formed on one of the surfaces of the solid electrolyte layer.

Next, a male mold 1004 having no protrusion portion is inserted into the cylindrical hole 1005 and this male mold 1004 and the one male mold 4006 are lightly pressed to thereby obtain a solid electrolyte layer having a structure [IV] shown in FIG. 6.

At this time, a molding pressure is preferably set to 3 ton/cm$^2$ or less. By setting the molding pressure to the above range, it is possible to firmly join (unite) the anode layer and the solid electrolyte layer together in the subsequent step.

Subsequently, the female mold 1003 is turned over so that the other recess portion formed on the other surface of the solid electrolyte layer, into which any member is not inserted, is positioned at an upper side. Then, the one male mold 4006 is removed from the cylindrical hole 1005, and the anode layer formed in the step <a> is inserted into the other recess portion.

Next, a male mold 1004 having no protrusion portion is inserted into the cylindrical hole 1005 and the two male molds 1004 are pressed. In this way, a battery device having a structure [V] shown in FIG. 6, in which the solid electrolyte layer interposed between the cathode layer and the anode layer, is manufactured.

<d> Restrictor Forming Step 40

<d1> This step is performed after the thus manufactured battery device is released from a compression state in the above battery device manufacturing step <c>.

As shown in FIGS. 4 and 5, first, a cathode extraction lead 6034, through which the cathode layer 3 and the cathode terminal 91 or 3E are to be electrically connected together, and an anode extraction lead 6044, through which the anode layer 4 and the anode terminal 90 or 4E are to be electrically connected together, are provided (attached) to the battery device.

Next, a restrictor 6080 is formed so as to cover almost all of the battery device other than the cathode extraction lead 6034 and the anode extraction lead 6044.

In the case where the restrictor 6080 is made of, e.g., a hot-melt resin (a hot-melt adhesive agent) or a low-melting-point glass, it is possible to form the restrictor 6080 by melting or softening the above material, supplying the same on an outer circumferential surface of the battery device and allowing the same to be cooled down and solidified.

According to this method, it is possible to reliably form the restrictor 6080 so as to cover almost all of the battery device, as shown in FIGS. 4 and 5.

Various kinds of methods can be used in order to supply the hot-melt resin or the low-melting-point glass in a melt or softened state (a liquid state) to the outer circumferential surface of the battery device.

Examples of these methods include: a method I of dipping the battery device into the hot-melt resin or the low-melting-point glass in a liquid state (that is, a dipping method); and a method II of coating the hot-melt resin or the low-melting-point glass in a liquid state on the outer circumferential surface of the battery device (that is, a coating method).

Further, in the case where the restrictor 6080 is made of, e.g., a thermosetting resin or a photocurable resin, it is possible to form the restrictor 6080 by supplying an uncured resin material in a liquid state to the outer circumferential surface of the battery device and curing the same through heating or light irradiation.

Use of this method also makes it possible to reliably form the restrictor 6080 so that it can cover almost all of the battery device.

Furthermore, by forming the restrictor 6080 by means of a vacuum encapsulation method, it is possible to prevent or suppress an air bubble (a space) from generating within the restrictor 6080. This makes it possible to improve mechanical strength of the restrictor 6080.

As a result, it is possible to restrict expansion of each of the solid electrolyte layer 5, the cathode layer 3 and the anode layer 4 in the plane direction thereof reliably. Therefore, it is possible to provide a battery device which can prevent reduction of a battery capacity over the lapse of charge-discharge cycles reliably.

The above-noted methods for supplying the hot-melt resin or the low-melting-point glass in a liquid state can be equally used in supplying the uncured resin material to the outer circumferential surface of the battery device.

<e> Battery Device Receiving Step 50

Next, as shown in FIGS. 4 and 5, the battery device with the restrictor 6080 is received into the container body 90 of the battery container 9.

<e1> First, the battery container 9 including the container body 90 having a bottom-closed hollow cylindrical shape and a lid 91 for closing a top opening of the container body 90 is prepare.

<e2> Next, an uncured material of a resin material such as a thermosetting resin or a photocurable resin is filled into the container body 90, and in this state, the battery device with the restrictor 6080 formed in the step <d> is received into the container body 90.

<e3> Thereafter, the uncured material filled into the container body 90 is cured so that the battery device with the restrictor 6080 is fixed to the container body 90 through the fixed portion 6090.

<e4> Next, the lid 91 is placed on the container body 90. At this time, in the case of FIG. 5, the cathode extraction lead 6034 and the anode extraction lead 6044 are, respectively, inserted into the insulating tubes 93 and electrically connected to the cathode terminals 3E and the anode terminal 4E each secured to the lid 91 through insulating tubes 93.

Further, in the case of FIG. 4, that is, the coin type battery container 9, after the battery device with the restrictor 6080 is received into the container body 90 of the battery container 9, particles made of the thermosetting resin may be filled into a space between the battery device with the restrictor 6080 and the container body 90.

<f> Battery Container Sealing Step 60

After the step <e> is preformed, the lid 91 and the container body 90 is bonded together using a adhesive agent or a packing agent while compressing them, to thereby seal the battery container 90.

Further, in the case where the particles made of the thermosetting resin are filled into the coin type battery container 9, after the battery container 9 is sealed, the particles filled thereinto may be heated together with the battery container 9 and the battery device, as a result of which these particles are cured to form the fixed portion 6090.

Furthermore, as alternative method, the all-solid secondary battery shown in FIG. 5 can be completed as follows. Namely, first, the lid 91 having a resin injection port is fixed to the container body 90 into which the battery device with the restrictor 6080 is received, so that the cathode extraction lead 6034 and the anode extraction lead 6044 are, respectively, electrically connected to the cathode terminal 3E and the anode terminal 4E each secured to the lid 91 through insulating tubes 93. Next, a liquid resin is injected into the battery container 9 by a vacuum encapsulation method (a degassing method) through the resin injection port, and then is cured. Thereafter, the resin injection port is sealed.

Through the above mentioned steps <a> to <f>, it is possible to obtain all-solid secondary batteries as shown in FIGS. 4 and 5.

Hereinbefore, although description has been made on a case that the electrochemical device of the present invention is used in the all-solid secondary battery, the present invention is not limited thereto.

The electrochemical device having the above solid electrolyte layer and the above electrode layers as a basic structure thereof can be preferably used in an electrical charge memory device, an electrochemical sensor, an electrochemical timer, an electrochemical actuator or an electrochemical display device in addition to the all-solid secondary battery.

Typical Experimental Procedures

Now, description will be made on concrete typical experimental procedures of the present invention in detail.

Experimental Procedure 1

In this Experimental procedure 1, a solid electrolyte layer using electrolyte particles (first particles) made of a silver-ion-conducting solid electrolyte (a silver-ion conductor) will be described.

The silver-ion-conducting solid electrolyte such as iodinated silver tungstate ($Ag_6I_4WO_4$) is used. The silver-ion-conducting solid electrolyte is received into an alumina pot and crushed using a planet ball milling machine with alumina balls to obtain a crushed matter.

This crushed matter is screened to obtain particles. Particles having a particle size of about 15 micrometers or less are utilized as the electrolyte particles (the first particles) to be used for forming the solid electrolyte layer.

On the other hand, particles having a particles size of about 15 micrometers or more are utilized as second particles to be used for carrying a binder composed of an organic polymer (that is, second particles to be used for producing binder particles).

Prior to producing the binder particles, first, block copolymer such as styrene-butadiene-styrene block copolymer (SBR) is prepared as the organic polymer consisting the binder, an organic solvent such as toluene is prepared for dissolving the binder, and then they are mixed with each other to thereby obtain a solution containing the block copolymer.

Next, this solution (binder solution or polymer solution) and the electrolyte particles (the second particles) to be used for carrying the binder are sufficiently mixed with each other to obtain a mixture solution, the organic solvent is evaporated and removed from the mixture solution to obtain a solid matter, and then the solid matter is crushed using a freeze crusher in the size of about 20 micrometers or less. In this way, the binder particles to be used for forming the electrolyte layer are obtained.

Subsequently, the electrolyte particles and the binder particles are mixed with each other in various ratios to prepare electrolyte mixture materials. Each of the electrolyte mixture materials is formed in the form of a disk having a diameter of about 10 mm according to the method of forming the solid electrolyte layer described in the above embodiment, to thereby obtain various solid electrolyte layers each having a structure [A] shown in FIG. 1 and a different amount of the binder.

Figure 7:
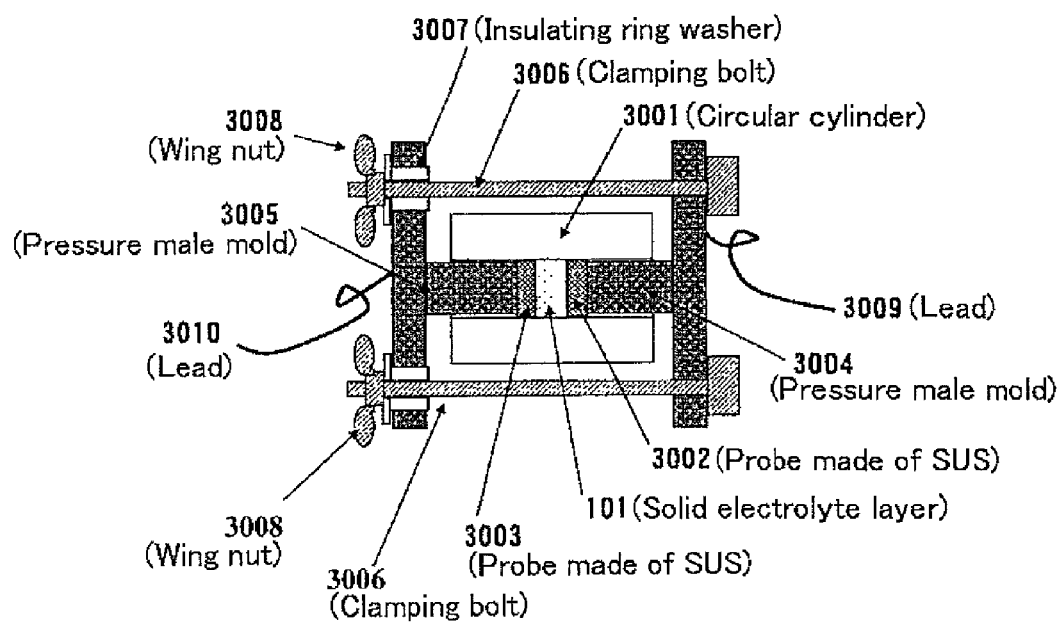
FIG. 7 is a vertical section view showing an ion conductivity measuring cell for measuring ion conductivity of the solid electrolyte layer.

Ion conductivity is measured for each of the thus obtained solid electrolyte layers using an ion conductivity measuring cell shown in FIG. 7.

As shown in FIG. 7, the ion conductivity measuring cell includes a circular cylinder 3001 made of PET with an external diameter of 35 mm and having a cylindrical hole with an internal diameter of 10 mm, probes 3002 and 3003 each made of SUS and being to be inserted into an one end of the cylindrical hole as an electrochemically inactive electrode, and pressure male molds 3004 and 3005 for improving a degree of contact between the probes 3002 and 3003 and the solid electrolyte layer 101.

Using such an ion conductivity measuring cell, the ion conductivity is measured as follows. First, the solid electrolyte layer is inserted into the cylindrical hole of the circular cylinder 3001. Next, the probes 3002 and 3003 are inserted into the cylindrical hole from both sides of the solid electrolyte layer, and then the pressure male molds 3004 and 3005 are inserted into the cylindrical hole from the opposite side of the probes 3002 and 3003 from the solid electrolyte layer.

Thereafter, four clamping bolts 3006 are passed through four through-halls each formed in the pressure male molds 3004 and 3005, and then the clamping bolts 3006 are clamped using four wing nuts 3008 while compressing the entire of the ion conductivity measuring cell at a pressure of 5 ton/cm$^2$. Next, an ion conductivity measuring apparatus is electrically connected to leads 3009 and 3010 attached to the pressure male molds 3004 and 3005 of the ion conductivity measuring cell.

In this state, the ion conductivity of the solid electrolyte layer is measured using the ion conductivity measuring apparatus.

The ion conductivity is reduced depending on increase of the amount of the binder contained in the solid electrolyte layer little by little.

Experimental Procedure 2

Various solid electrolyte layers can be formed in the same manner as in the Experimental procedure 1, except that various insulating particles other than the electrolyte particles made of the silver-ion-conducting solid electrolyte are utilized as the second particles to be used for carrying the binder.

In other words, in the Experimental procedure 2, various electrolyte mixture materials, in which the electrolyte particles made of the silver-ion-conducting solid electrolyte such as iodinated silver tungstate ($Ag_6I_4WO_4$) and the binder particles composed from the insulating particles carrying the binder thereon are mixed with each other, are used.

Alumina particles, silica particles and zirconia particles are prepared as the insulating particles, respectively. The binder particles are produced using the insulating particles according to the step <1-ii> described in the above embodiment. At this time, an amount of the binder to an amount of the binder particles is about 20 wt %.

The binder particles and the electrolyte particles are mixed with each other to prepare electrolyte mixture materials. In this regard, it is to be noted that the amount of the binder to an amount of each electrolyte mixture material is about 10 wt %.

Various solid electrolyte layers are formed using the electrolyte mixture materials, and ion conductivities thereof are measured in the same manner as in the Experimental procedure 1.

Experimental Procedure 3

A solid electrolyte layer is formed in the same manner as in the Experimental procedure 1, except that the electrolyte particles made of iodinated silver tungstate ($Ag_6I_4WO_4$) are changed to electrolyte particles made of iodinated silver molybdate ($Ag_6I_4MoO_4$)

And, ion conductivity thereof is measured in the same manner as in the Experimental procedure 1.

Experimental Procedure 4

Although the styrene-butadiene-styrene block copolymer (SBR) is used as the binder in the Experimental procedure 1, another organic polymers can, be used as the binder in this Experimental procedure 4.

Namely, solid electrolyte layers are formed in the same manner as in the Experimental procedure 1, except that the binder is changed from the styrene-butadiene-styrene block copolymer (SBR) to another organic polymer.

Specifically, as the organic polymers other than the styrene-butadiene-styrene block copolymer, styrene-isoprene-styrene block copolymer (SIS), styrene-ethylene-butylene-styrene block copolymer (SEBS) and hot-melt resin can be used, respectively.

Various binder particles are produced using the above organic polymers, and toluene as an organic solvent to be utilized for dissolving the organic polymers according to the steps <1-i> and <1-ii> described in the above embodiment.

Thereafter, various electrolyte mixture materials are prepared using the thus produced binder particles.

Various solid electrolyte layers are formed using the electrolyte mixture materials, and ion conductivities thereof are measured in the same manner as in the Experimental procedure 1.

Experimental Procedure 5

Solid electrolyte layers are formed in the same manner as in the Experimental procedure 1, except that the solid electrolyte is changed from the silver-ion-conducting solid electrolyte to a lithium-ion-conducting solid electrolyte.

Specifically, as the lithium-ion-conducting solid electrolyte, $Li_2S$—$SiS_2$—$B_2S_3$—$LiI$, $Li_2S$—$SiS_2$—$P_2S_5$—$LiI$, $Li_2S$—$P_2S_5$—$GeS_2$ and $Li_2S$—$SiS_2$—$Li_3PO_4$ each being a sulfide-based lithium-ion-conducting solid electrolyte can be used, respectively.

In this regard, the lithium-ion-conducting solid electrolyte is different from the silver-ion-conducting solid electrolyte used in the Experimental procedure 1, and it is very sensitive to moisture and easily degraded.

Therefore, in the case where the binder solution is prepared, the electrolyte mixture material is prepared using the binder solution, and the solid electrolyte layer is formed using the electrolyte mixture material, it must pay enough attention to remove the moisture from the materials to be used, and to prevent moisture of outside air from being mixed with the materials to be used. For these reasons, the materials are handled in the inside of a dry box set to inert atmosphere.

In this regard, it is to be noted that an amount of the binder to an amount of each of the electrolyte mixture materials is about 8 wt %. Thereafter, various solid electrolyte layers are formed using the electrolyte mixture materials, and ion conductivities thereof are measured using the similar ion conductivity measuring apparatus as employed in the Experimental procedure 1.

Experimental Procedure 6

In this Experimental procedure 6, a silver-ion-conducting all-solid secondary battery is manufactured as an all-solid secondary battery in which the electrochemical device related to the present invention is used.

When manufacturing the silver-ion-conducting all-solid secondary battery, the electrolyte mixture material prepared in the Experimental procedure 1 is utilized as an electrolyte mixture material to be used for forming a solid electrolyte layer. In this regard, it is to be noted that the electrode mixture material having the appropriate amount of the styrene-butadiene-styrene block copolymer of (typically, 8 wt %) to the amount thereof is utilized.

On the other hand, an electrode mixture material to be used for forming electrode layers is prepared as follows. Specifically, first, δ-type silver vanadate (δ-$Ag_{0.7}V_2O_5$) particles is prepared as electrode active material particles, iodinated silver tungstate ($Ag_6I_4WO_4$) particles are prepared as electrolyte particles, and iodinated silver tungstate ($Ag_6I_4WO_4$) particles each carrying styrene-butadiene-styrene block copolymer (SBR) in an appropriate weight ratio (for example, 20 wt %) are prepared as binder particles, respectively.

Next, the δ-type silver vanadate particles and the iodinated silver tungstate particles are mixed with each other in an appropriate weight ratio (typically, 6:4), and then the iodinated silver tungstate ($Ag_6I_4WO_4$) particles each carrying the styrene-butadiene-styrene block copolymer are added to the same.

Thereafter, these particles are sufficiently mixed with each other and crushed to thereby obtain the electrode mixture material.

Using the electrolyte mixture material and the electrode mixture material, a coin type all-solid secondary battery shown in FIG. 4 is manufactured. As shown in FIG. 4, a battery device is configured by interposing a solid electrolyte layer 5 between a cathode layer 3 and an anode layer 4.

In the battery device, the cathode layer 3 and the anode layer 4 are formed using the above mentioned electrode mixture material. Therefore, the cathode layer 3 and the anode layer 4 have the same electrode mixture material composition. Further, each of the cathode layer 3 and the anode layer 4 is formed from the same electrode layer 603 having a disk shape and a structure [G] shown in FIG. 3.

In this regard, a cathode collector, in which a cathode expanded mesh 6031 and a cathode lead board 6032 are joined together, is buried in the cathode layer 3, and an anode collector, in which an anode expanded mesh 6041 and an anode lead board 6042 are joined together, is buried in the anode layer 4.

The battery device is manufactured according to the step <c>, that is, the battery device manufacturing step 30 described in the above embodiment.

First, as shown in the right side of FIG. 3, molds including a female mold having an internal diameter (typically, 10 mm) and an external diameter (typically, 30 mm) are prepared as molds to be used for forming an electrode layer.

Next, the cathode layer 3 and the anode layer 4 are formed using the thus prepared molds and the above prepared electrode mixture material. As the cathode layer 3 and the anode layer 4, the electrode layers 603 each having a disk shape with a diameter (typically, 10 mm) and a thickness (typically, 0.5 mm) and a structure [G] shown in FIG. 3 are formed.

Next, as shown in the right side of FIG. 6, a female mold 1003 to be used for forming a battery device is prepared. In this regard, the female mold 1003 has an external diameter and a cylindrical hole 1005 with an internal diameter. One male mold 4006 having a protrusion portion 4007 with a diameter (typically, 10.0 mm) and a thickness (typically, 0.5 mm) is inserted into the cylindrical hole 1005 of the female mold 1003 as a lower mold.

In this state, the electrolyte mixture material 1000 is filled in the cylindrical hole 1005, a top surface of a layer formed of the electrolyte mixture material 1000 was leveled, the other male mold 4006 is inserted into the cylindrical hole 1005 as an upper mold, and then the two male molds 4006 are lightly pressed so that the electrolyte mixture material 1000 is molded, to thereby obtain a solid electrolyte layer 104 having a structure [D] shown in FIG. 1.

Thereafter, the other male mold 4006 is removed from the cylindrical hole 1005, and the cathode layer 3 formed in advance, in which the cathode collector obtained by joining the cathode lead board and the cathode expanded mesh is buried, is inserted into one of recess portions formed on both of surfaces of the solid electrolyte layer 104.

Next, a male mold 1004 having no protrusion portion is inserted into the cylindrical hole 1005, and then this male mold 1004 and the one male mold 4006 are lightly pressed, to thereby obtain a solid electrolyte layer 5 (104) having a structure [IV] shown in FIG. 6.

At this time, a molding pressure is preferably set to 3 ton/cm$^2$ or less. By doing so, it is possible to firmly join the anode layer and the solid electrolyte layer together in the subsequent step.

Subsequently, the female mold 1003 is turned over so that the other recess portion formed on the surface of the solid electrolyte layer 104, into which any member is not inserted, is positioned at an upper side. Then, the one male mold 4006 is removed from the cylindrical hole 1005, and the anode layer 4 formed in advance is inserted into the other recess portion.

Next, a male mold 1004 having no protrusion portion is inserted into the cylindrical hole 1005, and then the two male molds 1004 are pressed. In this way, a battery device 2 having a structure [V] shown in FIG. 6, in which the solid electrolyte layer 5 (104) is interposed between the cathode layer 3 and the anode layer 4, is manufactured.

At this time, a molding pressure was preferably set to 4 to 5 ton/cm$^2$ or less. By doing so, the cathode layer 3, the anode layer 4 and the solid electrolyte layer 5 (104) are firmly joined together.

Next, as shown in FIG. 4, a cathode lead board 6032 and an anode lead board 6042 are, respectively, attached to the cathode layer 3 and the anode layer 4 of the manufactured battery device 2. Thereafter, almost all of the battery device other than the cathode lead board 6032 and the anode lead board 6042 is covered with a hot-melt resin, and then it is cured.

A cured product of such a hot-melt resin would serve as a restrictor 6080 being able to suppress expansion and contraction of volumes of the cathode layer 3 and the anode layer 4 due to structural changes of crystals of the electrode active material when the battery device 2 is in charge-discharge operation.

The obtained battery device 2 with the restrictor 6080 is inserted into a container body 90 of a battery container 9. Thermosetting epoxy powder is filled into a space formed within the container body 90, and then a top opening of the container body 90 is closed by a lid 91 through an insulating packing agent 17 while pressing the lid 91 against the container body 90.

Thereafter, the thermosetting epoxy powder filled into the space is heated together with the battery device 2 with the restrictor 6080 and the battery container 9 and cured. In this way, the silver-ion-conducting all-solid secondary battery shown in FIG. 4 is obtained.

Thereafter, an initial charge-discharge property and a property of a discharge voltage against a discharge current density of the thus obtained all-solid secondary battery are checked.

As the initial charge-discharge property, initial charge-discharge behavior was checked by charging the all-solid secondary battery up to 0.52 V at a current density of 0.1 mAh/cm$^2$, stopping charge operation at the moment when an electrical current became equal to 20 μA, and then discharging it at a current density of 0.1 mAh/cm$^2$.

On the other hand, as the property of the discharge voltage against the discharge current density, a terminal voltage of the all-solid secondary battery is checked at the moment when a discharge capacity thereof becomes equal to 10.0 mAh/gr against the used electrode active material by discharging it at a current density of 0.1, 0.2, 0.4, 0.6 or 1.0 mAh/cm$^2$ after it is charged in the same manner as described above.

Experimental Procedure 7

In the Experimental procedure 6, the electrolyte particles made of the silver-ion-conducting solid electrolyte and carrying the binder are utilized as the binder particles to be used for preparing the electrolyte mixture material.

On the other hand, in this Experimental procedure 7, various all-solid secondary batteries are manufactured in the same manner as in the Experimental procedure 6, except that alumina particles, silica particles and zirconia particles are, respectively, used as the second particles to be used for carrying the binder and the binder particles to be used for preparing the electrolyte mixture material are produced by carrying the binder on surfaces of the above particles.

Thereafter, a discharge property of each of the thus manufactured all-solid secondary batteries is checked.

Experimental Procedure 8

In the Experimental procedure 6, the electrolyte particles made of the silver-ion-conducting solid electrolyte and carrying the binder are utilized as the binder particles to be used for preparing the electrode mixture material.

On the other hand, in this Experimental procedure 8, various all-solid secondary batteries are manufactured in a similar manner as in the Experimental procedure 6, except that alumina particles, silica particles and zirconia particles are, respectively, used as the second particles to be used for carrying the binder and the binder particles to be used for preparing the electrode mixture material are produced by carrying the binder on surfaces of the above particles.

Thereafter, a discharge property of each of the thus manufactured all-solid secondary batteries is checked.

Experimental Procedure 9

In the Experimental procedure 6, the electrolyte particles made of the silver-ion-conducting solid electrolyte and carrying the binder are utilized as the binder particles to be used for preparing the electrode mixture material.

On the other hand, in this Experimental procedure 9, various all-solid secondary batteries are manufactured in the same manner as in the Experimental procedure 6, except that graphite particles, acetylene black particles each having a particle size (typically, 20 micrometers) and silver particles each having a particle size (typically, 15 micrometers) are, respectively, used as the second particles to be used for carrying the binder and the binder particles to be used for preparing the electrode mixture material are produced by carrying the binder on surfaces of the above particles.

Thereafter, a discharge property of each of the thus manufactured all-solid secondary batteries is checked.

Experimental Procedure 10

In this Experimental procedure 10, a sulfide-based lithium-ion-conducting all-solid secondary battery, including a cathode layer, an anode layer and a solid electrolyte layer each having a square shape, is manufactured as an all-solid secondary battery in which the electrochemical device related to the present invention is used.

When manufacturing the sulfide-based lithium-ion-conducting all-solid secondary battery, as molds to be used for forming the cathode and anode layers, a female mold and two male molds each corresponding to the female mold are prepared.

Further, as molds to be used for manufacturing the battery device (the solid electrolyte layer), a female mold and two male molds each corresponding to the female mold and a protrusion portion are prepared.

In this regard, it is to be noted that the protrusion portion is used for forming a recess portion at a central portion of the solid electrolyte layer. The sulfide-based lithium-ion-conducting all-solid secondary battery is manufactured using the above molds in the same manner as in the Experimental procedure 6.

In this Experimental procedure 10, the electrolyte mixture material prepared in the Experimental procedure 5 is used as an electrolyte mixture material. Namely, the electrolyte mixture material contained the electrolyte particles made of the $Li_2S$—$SiS_2$—$Li_3PO_4$ which is an amorphous sulfide-based lithium-ion-conducting solid electrolyte (an amorphous sulfide-based lithium-ion conductor).

Further, a cathode mixture material to be used for forming a cathode layer is prepared as follows. Specifically, first, lithium cobaltate ($Li_xCoO_2$) particles are prepared as cathode active material particles, $Li_2S$—$SiS_2$—$Li_3PO_4$ (ternary amorphous lithium-ion-conducting solid electrolyte consisting of lithium sulfide, silicon sulfide and lithium phosphate) particles were prepared as electrolyte particles, and $Li_2S$—$SiS_2$—$Li_3PO_4$ particles each having a particle size (typically, 15 micrometers) or less and carrying styrene-butadiene-styrene block copolymer (SBR) in an appropriate weight ratio (typically, 20 wt %) are prepared as binder particles, respectively.

Next, the lithium cobaltate particles and the $Li_2S$—$SiS_2$—$Li_3PO_4$ particles are mixed with each other in a weight ratio (typically, 8:2), and then the $Li_2S$—$SiS_2$—$Li_3PO_4$ particles each carrying the styrene-butadiene-styrene block copolymer are added to the same.

Thereafter, these particles are sufficiently mixed with each other and crushed to thereby obtain the cathode mixture material.

On the other hand, an anode mixture material to be used for forming an anode layer is prepared as follows. Specifically, first, metallic indium particles each having a particle size (typically, 10 micrometers) are prepared as anode active material particles, $Li_2S$—$SiS_2$—$Li_3PO_4$ (ternary amorphous lithium-ion-conducting solid electrolyte consisting of lithium sulfide, silicon sulfide and lithium phosphate) particles are prepared as electrolyte particles, and $Li_2S$—$SiS_2$—$Li_3PO_4$ particles each having a particle size of about 15 micrometers or less and carrying styrene-butadiene-styrene block copolymer (SBR) in an appropriate weight ratio (typically, 20 wt %) are prepared as binder particles, respectively.

Next, the metallic indium particles and the $Li_2S$—$SiS_2$—$Li_3PO_4$ particles are mixed with each other in a weight ratio (typically, 6:4), and then the $Li_2S$—$SiS_2$—$Li_3PO_4$ particles each carrying the styrene-butadiene-styrene block copolymer are added to the same.

Thereafter, these particles are sufficiently mixed with each other and crushed to thereby obtain the anode mixture material.

Further, a copper expanded mesh having a thickness (typically, 70 micrometers) and an occupation percentage of through-holes (typically, 75%) is prepared for forming an anode collector, and a copper expanded mesh having a thickness (typically, 70 micrometers) and an occupation percentage of through-holes (typically, 75%), on which titanium is deposited, is prepared for forming a cathode collector.

Furthermore, a copper foil having a thickness (typically, 50 micrometers) is prepared as an anode lead board to be used for forming the anode collector, and a copper foil having a thickness (typically, 50 micrometers), on which titanium is deposited, is prepared as a cathode lead board to be used for forming the cathode collector.

Subsequently, the copper expanded mesh and the copper foil are welded and fixed together at a plurality of points using a spot welding, and then they are cut to a required size having a length (typically, 15 mm) and a width (typically, 15 mm), to thereby obtain the anode collector.

Likewise, the titanium deposited copper expanded mesh and the titanium deposited copper foil are welded and fixed together at a plurality of points using a spot welding, and then they are cut to a required size having a length (typically, 15 mm) and a width (typically, 15 mm), to thereby obtain the cathode collector.

In advance, cathode and anode layers are formed using the cathode and anode mixture materials, the cathode and anode collectors and the molds to be used for forming the cathode and anode layers.

Next, using the thus formed cathode and anode layers and the above prepared molds to be used for manufacturing the battery device, an all-solid secondary battery having a square shape, as shown in FIG. 5, is manufactured according to the flowchart illustrating the method for manufacturing the all-solid secondary battery shown in FIG. 9.

Further, as shown in FIG. 5, the all-solid secondary battery is provided with a battery device in which the solid electrolyte layer is positioned between the cathode layer and the anode layer, and peripheral portions of the cathode and anode layers are covered with the solid electrolyte layer.

Thereafter, an initial charge-discharge property and a property of a discharge voltage against a discharge current density of the thus obtained all-solid secondary battery are checked.

Experimental Procedure 11

In the Experimental procedure 10, the electrolyte particles made of the ternary lithium-ion-conducting solid electrolyte (i.e., $Li_2S$—$SiS_2$—$Li_3PO_4$) and carrying the binder are utilized as the binder particles to be used for preparing the electrolyte mixture material.

On the other hand, in this Experimental procedure 11, various secondary batteries are manufactured in the same manner as in the Experimental procedure 10, except that alumina particles, silica particles and zirconia particles were, respectively, used as the second particles to be used for carrying the binder, and the binder particles to be used for preparing the electrolyte mixture material are produced by carrying the binder on surface of the above particles.

Thereafter, a discharge property of each of the thus manufactured all-solid secondary batteries is checked.

Experimental Procedure 12

In the Experimental procedure 10, the electrolyte particles made of the ternary lithium-ion-conducting solid electrolyte (i.e., $Li_2S$—$SiS_2$—$Li_3PO_4$) and carrying the binder are utilized as the binder particles to be used for preparing the electrode mixture material.

On the other hand, in this Experimental procedure 12, various all-solid secondary batteries are manufactured in the same manner as in the Experimental procedure 10, except that alumina particles, silica particles and zirconia particles are, respectively, used as the second particles to be used for carrying the binder, and the binder particles to be used for preparing the electrode mixture material are produced by carrying the binder on surfaces of the above particles.

Thereafter, a discharge property of each of the thus manufactured all-solid secondary batteries is checked.

Experimental Procedure 13

In the Experimental procedure 10, the electrolyte particles made of the ternary lithium-ion-conducting solid electrolyte (i.e., $Li_2S$—$SiS_2$—$Li_3PO_4$) and carrying the binder are utilized as the binder particles to be used for preparing the electrode mixture material.

On the other hand, in this Experimental procedure 13, various all-solid secondary batteries are manufactured in the same manner as in the Experimental procedure 10, except that graphite particles, acetylene black particles each having a particle size (typically, 20 micrometers) and silver particles each having a particle size (typically, 20 Micrometers) are, respectively, used as the second particles to be used for carrying the binder, and the binder particles to be used for preparing the electrode mixture material are produced by carrying the binder on surfaces of the above particles.

Thereafter, a discharge property of each of the thus manufactured all-solid secondary batteries is checked.

Experimental Procedure 14

In the Experimental procedure 10, the sulfide-based lithium-ion-conducting all-solid secondary battery is manufactured using the ternary lithium-ion-conducting solid electrolyte (i.e., $Li_2S$—$SiS_2$—$Li_3PO_4$) as an all-solid secondary battery in which the electrochemical device of the present invention is used.

On the other hand, in this Experimental procedure 14, a lithium-ion-conducting all-solid secondary battery was manufactured in the same manner in the Experimental procedure 10 except that the ternary lithium-ion-conducting solid electrolyte is changed from the $Li_2S$—$SiS_2$—$Li_3PO_4$. to $Li_2S$—$P_2S_5$—$GeS_2$ (i.e. thio-silicon).

Namely, in this Experimental procedure 14, the electrolyte mixture material prepared in the Experimental procedure 5 is used as an electrolyte mixture material. Namely, the electrolyte mixture material contained the electrolyte particles made of the $Li_2S$—$P_2S_5$—$GeS_2$ which is a crystalline sulfide-based lithium-ion-conducting solid electrolyte.

Further, a cathode mixture material to be used for forming a cathode layer is prepared as follows. Specifically, first, lithium cobaltate ($Li_xCoO_2$) particles are prepared as cathode active material particles, $Li_2S$—$P_2S_5$—$GeS_2$ (ternary crystalline lithium-ion-conducting solid electrolyte) particles were prepared as electrolyte particles, and $Li_2S$—$P_2S_5$—$GeS_2$ particles each having a particle size of about 15 micrometers or less and carrying styrene-butadiene-styrene block copolymer (SBR) in a weight ratio (typically, 20 wt %) are prepared as binder particles, respectively.

Next, the lithium cobaltate particles and the $Li_2S$—$P_2S_5$—$GeS_2$ particles were mixed with each other in a weight ratio (typically, 8:2), and then the $Li_2S$—$P_2S_5$—$GeS_2$ particles each carrying the styrene-butadiene-styrene block copolymer are added to the same.

Thereafter, these particles are sufficiently mixed with each other and crushed to thereby obtain the cathode mixture material.

On the other hand, an anode mixture material to be used for forming an anode layer is prepared as follows. Specifically, first, metallic indium particles each having a particle size (typically, 10 micrometers) are prepared as anode active material particles, $Li_2S$—$P_2S_5$—$GeS_2$ (ternary crystalline lithium-ion-conducting solid electrolyte) particles are prepared as electrolyte particles, and $Li_2S$—$P_2S_5$—$GeS_2$ particles each having a particle size of about 15 micrometers or less and carrying styrene-butadiene-styrene block copolymer (SBR) in a weight ratio (typically, 20 wt %) are prepared as binder particles, respectively.

Next, the metallic indium particles and the $Li_2S$—$P_2S_5$—$GeS_2$ particles are mixed with each other in a weight ratio (typically, 6:4), and then the $Li_2S$—$P_2S_5$—$GeS_2$ particles each carrying the styrene-butadiene-styrene block copolymer are added to the same.

Thereafter, these particles are sufficiently mixed with each other and crushed to thereby obtain an anode mixture material.

Further, a copper expanded mesh having a thickness (typically, 70 micrometers) and an occupation percentage (typically, through-holes of 75%) is prepared for forming an anode collector, and a copper expanded mesh having a thickness (typically, 70 micrometers) and an occupation percentage of through-holes (typically, 75%), on which titanium is deposited, is prepared for forming a cathode collector.

Furthermore, a copper foil having a thickness (typically, 50 micrometers) is prepared as an anode lead board to be used for forming the anode collector, and a copper foil having a thickness (typically, 50 micrometers), on which titanium is deposited, is prepared as a cathode lead board to be used for forming the cathode collector.

Subsequently, the copper expanded mesh and the copper foil are welded and fixed together at a plurality of points using a spot welding, and then they are cut to a required size having a length (typically, 15 mm) and a width (typically, 15 mm), to thereby obtain the anode collector.

Likewise, the titanium deposited copper expanded mesh and the titanium deposited copper foil are welded and fixed together at a plurality of points using a spot welding, and then they are cut to a required size having a length (typically, 15 mm) and a width (typically, 15 mm), to thereby obtain the cathode collector.

In advance, cathode and anode layers are formed using the cathode and anode mixture materials, the cathode and anode collectors and the molds to be used for forming the cathode and anode layers.

Next, using the thus formed cathode and anode layers and the above prepared molds to be used for manufacturing the battery device, an all-solid secondary battery having a square shape, as shown in FIG. 5, is manufactured according to the flowchart illustrating the method for manufacturing the all-solid secondary battery shown in FIG. 9.

Further, as shown in FIG. 5, the all-solid secondary battery is provided with a battery device in which a solid electrolyte layer is positioned between the cathode layer and the anode layer, and peripheral portions of the cathode and anode layers are covered with the solid electrolyte layer.

Hereinbefore, in the all-solid secondary battery manufactured in this way, the battery device is configured by interposing the solid electrolyte layer 5 between the cathode layer 3 and the anode layer 4.

Further, the cathode extraction lead 6034 and the anode extraction lead 6044 each having electrical conductivity are, respectively, connected to the cathode layer 3 and the anode layer 4, and serve as lead lines through which electricity is charged to and discharged from the battery device.

In the all-solid secondary battery, almost all of the battery device other than the cathode extraction lead 6034 and the anode extraction lead 6044 is covered with the restrictor 6080, thus allowing the cathode extraction lead 6034 and the anode extraction lead 6044 to be exposed to the outside.

The restrictor 6080 serves mainly to restrict expansion of each of the cathode layer 3 and the anode layer 4 in a plane direction thereof (in a direction generally perpendicular to a direction crossing the cathode layer 3 and the anode layer 4) and the resultant expansion of the solid electrolyte layer 5 in a plane direction thereof.

In the battery device (the all-solid secondary battery), crystal structures of the electrode active material contained in the cathode layer 3 and the anode layer 4 are three-dimensionally deformed (expanded or contracted) in response to charge-discharge operations thereof.

In a hypothetical case that the all-solid secondary battery is not provided with the restrictor 6080, the cathode layer 3 and the anode layer 4 are heavily deformed (expanded or contracted) in the plane direction thereof but not in a thickness direction thereof as the crystal structures of the electrode active material are three-dimensionally deformed or changed.

As a result, especially in peripheral portions of the cathode layer 3 and the anode layer 4, a bond inhibition phenomenon that breaks or disconnects an electronic bond or an ion-conducting path is created. This makes it difficult for an electric current to flow through the peripheral portions of the cathode layer 3 and the anode layer 4 when charging or discharging the battery device.

Further, at this time, the solid electrolyte layer 5 is also deformed (expanded or contracted) in the plane direction thereof due to the expansion or contraction of the cathode layer 3 and the anode layer 4 in the plane direction thereof, thereby forming a protruding portion that protrudes from the cathode layer 3 and the anode layer 4. In the protruding portion the ion-conducting path is broken.

This phenomenon proceeds gradually as the battery device included in the all-solid secondary battery is repeatedly charged and discharged. As a consequence, a battery capacity of the battery device is gradually reduced, which makes it difficult to charge and discharge the all-solid secondary battery.

In contrast, the all-solid secondary battery of the above embodiment is configured to have the restrictor 6080 that serves to restrict expansion of each of the cathode layer 3 and the anode layer 4 in the plane direction thereof and the resultant expansion of the solid electrolyte layer 5 in the plane direction thereof. Thus, the battery device can be kept in a shape as close to an initial shape as possible when manufacturing the all-solid secondary battery and charging and discharging the same.

That is to say, the afore-mentioned problem can be avoided by restricting expansion of the cathode layer 3, the anode layer 4 and the solid electrolyte layer 5 in the plane direction thereof. As a result, it becomes possible to avoid battery capacity reduction which would otherwise occur over a lapse of charge-discharge cycles (by multiple times of charge-discharge operations).

The restrictor 6080 is preferably made of an insulating material. This helps to reliably prevent short-circuit between the cathode layer 3 and the anode layer 4.

Alternatively, the restrictor 6080 may be made of a conducting material (e.g., metallic material or the like). In this case, it is prepared that an insulating layer (an insulating sheet) is interposed between the battery device and the restrictor 6080.

Examples of the insulating material include various kinds of resin materials such as a thermoplastic resin, a thermosetting resin and a photocurable resin, various kinds of glass materials and various kinds of ceramics materials.

Among these materials, it is desirable that the insulating material is mainly any one of a thermoplastic resin, a thermosetting resin, a photocurable resin and a low-melting-point glass or a combination of two or more of them. Use of these materials allows the restrictor 6080 to be formed with ease. Furthermore, use of these materials helps to increase mechanical strength of the restrictor 6080.

Examples of the thermoplastic resin include polyolefin, ethylene-vinyl acetate copolymer, polyamide, polyimide, hot-melt resin and the like. Examples of the thermosetting resin include epoxy-based resin, polyurethane-based resin, phenol-based resin and the like.

Further, examples of the photocurable resin include epoxy-based resin, urethane acrylate-based resin, vinyl ether-based resin and the like. Examples of the low-melting-point glass include $P_2O_5$—$CuO$—$ZnO$-based low-melting-point glass, $P_2O_5$—$SnO$-based low-melting-point glass, $B_2O_3$—$ZnO$—$Bi_2O_3$—$Al_2O_3$-based low-melting-point glass and the like.

An average thickness of the restrictor 6080 (particularly, an average thickness of an end portion thereof) is preferably about in the range of 50 to 5000 μm, and more preferably in the range of about 100 to 500 μm, although it may be slightly changed depending on the constituent material and intended use of the restrictor 6080.

By setting the average thickness within this range, it is possible to reliably prevent expansion of each of the cathode layer 3, the anode layer 4 and the solid electrolyte layer 5 in the plane direction thereof, thereby allowing the restrictor 6080 to play its role in a reliable manner.

In this regard, it is to be noted that in the case where the fixed portion 6090 shown in each of FIGS. 4 and 5 is made of the same material as the constituent material of the restrictor 6080, the restrictor 6080 may be omitted from the all-solid secondary battery.

As described above, the battery container 9 can receive the battery device with the restrictor 6080 and has a function of protecting the battery device from external impact or the like.

Further, the battery container 9 includes the container body 90 having the bottom-closed hollow cylindrical shape and the lid 91 for closing the top opening of the container body 91. The battery device with the restrictor 6080 are fixed in the inside of the container body 90 through the fixed portion 6090.

Furthermore, as shown in FIG. 5, the cathode extraction lead 6034 and the anode extraction lead 6044 are inserted through the lid 91 and fixed or attached to the lid 91 by way of the insulating tubes 93 so that they can be kept free from short-circuit.

Examples of a constituent material of the battery container 9 (the container body 90 and the lid 91) include various kinds of metallic materials such as aluminum, copper, brass and stainless steel, various kinds of resin materials, various kinds of ceramics materials, various kinds of glass materials, various kinds of composite materials comprising the metal material and the resin material and the like, and one or more kind of which may be used independently or in combination.

Further, examples of a constituent material of the fixed portion 6090 include curable resins such as a thermosetting resin and a photocurable resin, a thermoplastic resin and a low-melting-point glass each mentioned as the restrictor 6080, and the like.

In the case where the all-solid secondary battery has such a battery container 9, it is possible to reliably protect the battery device provided within the battery container 9 from the external impact or the like thereof, and to reliably restrict expansion of each of the cathode layer 3, the anode layer 4 and the solid electrolyte layer 5 in the plane direction thereof.

In addition, such a battery structure helps to prevent infiltration of external moisture into the battery device and can be suitably used in constructing an all-solid secondary battery (particularly, a lithium-ion-conducting all-solid secondary battery).

Hereinbefore, although the all-solid secondary battery, in which the electrochemical device according to the present invention is used, have been described based on the embodiments illustrated in the drawings, the present invention is not limited thereto.

The solid electrolyte layer formed using the electrolyte mixture material described above has more excellent ion conductivity as compared to a solid electrolyte layer formed using a conventional electrolyte mixture material.

Further, the electrode layer formed using the electrode mixture material described above has a more superior ion-conducting path therein as compared to an electrode layer formed using a conventional electrode mixture material.

Therefore, it is believed that various kinds of electrochemical apparatuses, in which the electrochemical device having such a solid electrolyte layer and/or such an electrode layer is provided, can exhibit excellent properties.

For example, in the case where the solid electrolyte layer is made of the silver-ion-conducting solid electrolyte and the cathode layer and the anode layer are, respectively, made of silver and stainless steel (SUS), the electrochemical device can be used as an electrical charge censor. Therefore, an electrochemical timer can be easily constituted from such an electrical charge censor.

Further, the battery device having the structure described in the Experimental procedure 1 can be used as an electrochemical actuator by utilizing the volume change of the electrode active material when electrifying between the cathode layer and the anode layer.

Furthermore, in the case where a semiconductor photo-electrode layer is provided on one layer of the cathode and anode layers of the battery device having the structure described in the Experimental procedure 1, such a battery device can be used as a photosensitive secondary battery which can be charged by means of light.

Moreover, in the case where an electrochromic layer made of an electrochromic material is provided on one layer of the cathode and anode layers of the battery device having the structure described in the Experimental procedure 1, such a battery device can be used as an electrochromic display apparatus.

As described above, the electrochemical device according to the present invention can be used for constructing not only the above all-solid secondary battery but also various kinds of electrochemical apparatuses.

EXAMPLES

Example 1

In this example 1, a solid electrolyte layer using electrolyte particles (first particles) made of a silver-ion-conducting solid electrolyte (a silver-ion conductor) will be described.

Iodinated silver tungstate ($Ag_6I_4WO_4$) was used as the silver-ion-conducting solid electrolyte. The iodinated silver tungstate was received into an alumina pot and crushed using a planet ball milling machine with alumina balls to obtain a crushed matter.

This crushed matter was screened to obtain particles. Particles having a particle size of about 15 micrometers or less were utilized as the electrolyte particles (the first particles) to be used for forming the solid electrolyte layer. On the other hand, particles having a particles size of about 15 micrometers or more were utilized as second particles to be used for carrying a binder composed of an organic polymer (that is, second particles to be used for producing binder particles).

Prior to producing the binder particles, first, styrene-butadiene-styrene block copolymer (SBR) was prepared as the organic polymer consisting the binder, toluene was prepared as an organic solvent to be used for dissolving the binder, and then they were mixed with each other to thereby obtain a toluene solution containing the styrene-butadiene-styrene block copolymer at a concentration of 30 wt %.

Next, this toluene solution (binder solution or polymer solution) and the electrolyte particles (the second particles) to be used for carrying the binder were sufficiently mixed with each other to obtain a mixture solution, the toluene was evaporated and removed from the mixture solution to obtain a solid matter, and then the solid matter was crushed using a freeze crusher in the size of about 20 micrometers or less. In this way, the binder particles to be used for forming the electrolyte layer were obtained.

Subsequently, the electrolyte particles and the binder particles were mixed with each other in various ratios to prepare electrolyte mixture materials. Each of the electrolyte mixture materials was formed in the form of a disk having a diameter of 10 mm according to the method of forming the solid electrolyte layer described in the above embodiment, to thereby obtain various solid electrolyte layers each having a structure [A] shown in FIG. 1 and a different amount of the binder.

Ion conductivity was measured for each of the thus obtained solid electrolyte layers using an ion conductivity measuring cell shown in FIG. 7.

As shown in FIG. 7, the ion conductivity measuring cell included a circular cylinder 3001 made of PET with an external diameter of 35 mm and having a cylindrical hole with an internal diameter of 10 mm, probes 3002 and 3003 each made of SUS and being to be inserted into an one end of the cylindrical hole as an electrochemically inactive electrode, and pressure male molds 3004 and 3005 for improving a degree of contact between the probes 3002 and 3003 and the solid electrolyte layer 101.

Using such an ion conductivity measuring cell, the ion conductivity was measured as follows. First, the solid electrolyte layer was inserted into the cylindrical hole of the circular cylinder 3001. Next, the probes 3002 and 3003 were inserted into the cylindrical hole from both sides of the solid electrolyte layer, and then the pressure male molds 3004 and 3005 were inserted into the cylindrical hole from the opposite side of the probes 3002 and 3003 from the solid electrolyte layer.

Thereafter, four clamping bolts 3006 were passed through four through-halls each formed in the pressure male molds 3004 and 3005, and then the clamping bolts 3006 were clamped using four wing nuts 3008 while compressing the entire of the ion conductivity measuring cell at a pressure of 5 ton/cm². Next, an ion conductivity measuring apparatus was electrically connected to leads 3009 and 3010 attached to the pressure male molds 3004 and 3005 of the ion conductivity measuring cell.

In this state, the ion conductivity of the solid electrolyte layer was measured using the ion conductivity measuring apparatus.

Figure 8:
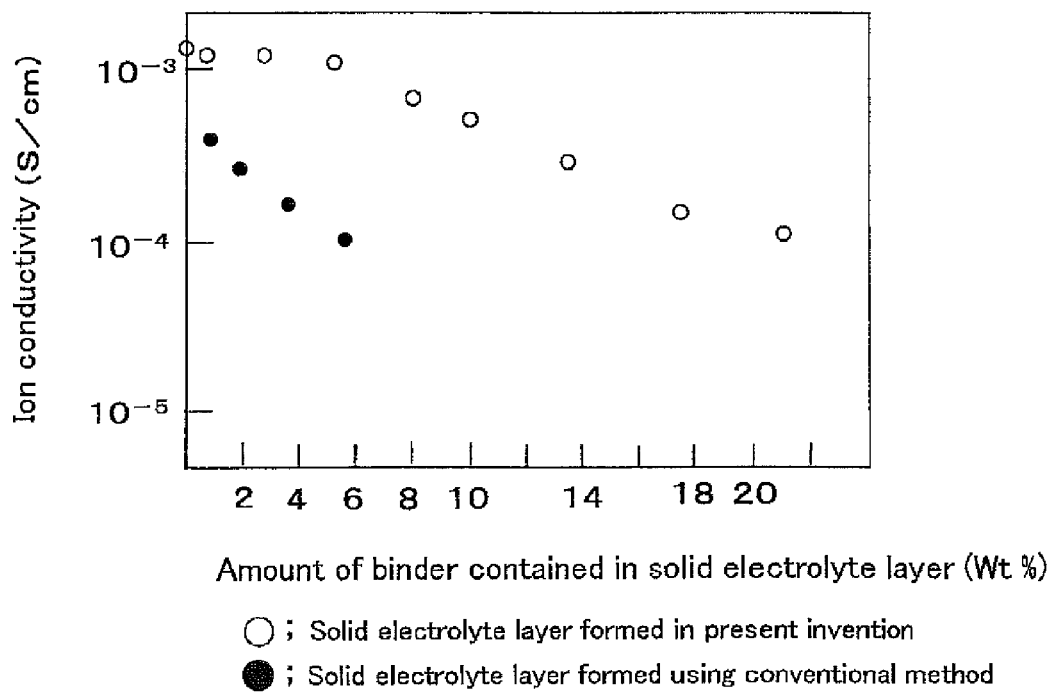
FIG. 8 is a graph showing an effect of an amount of a binder on silver-ion conductivity in a silver-ion-conducting solid electrolyte layer.

A value of the ion conductivity of each of the solid electrolyte layers is shown with a symbol "o" in FIG. 8. As is apparent from these results, the ion conductivity of the solid electrolyte layer containing no binder was about $2.5 \times 10^{-2}$ S/cm, but the ion conductivity was reduced depending on increase of the amount of the binder contained in the solid electrolyte layer little by little.

The ion conductivity of the solid electrolyte layer having the amount of the binder of 20 wt % or more was about $1.1 \times 10^{-4}$ S/cm, which was lower than a value that required for a practical all-solid secondary battery, that is, $4 \times 10^{-4}$ S/cm.

Comparative Example 1

In order to confirm an effect in the Example 1, an organic solvent (toluene) was added to the same electrolyte mixture materials as prepared in the Example 1 so that the binders contained therein were dissolved in the organic solvent to obtain various slurries, the organic solvent was evaporated and removed from the slurries to obtain solid matters, and then the solid matters were crushed using a planet ball milling machine in the size of about 20 micrometers or less, to thereby obtain crushed matters. These crushed matters were used as electrolyte mixture materials, respectively.

Various solid electrolyte layers each having a different amount of the binder were formed using these electrolyte mixture materials, and ion conductivities thereof were measured in the same manner as in the Example 1.

A value of the ion conductivity of each of the solid electrolyte layers is shown with a symbol "•" in FIG. 8. As is apparent from these results, in the case where each of the solid electrolyte layers contained electrolyte particles all covered with the binder, the ion conductivity thereof was exponentially reduced depending on increase of the amount of the binder contained in the solid electrolyte layer.

Example 2

Although the styrene-butadiene-styrene block copolymer (SBR) was used as the binder in the Example 1, another organic polymers were used as the binder in this Example 2.

Namely, solid electrolyte layers were formed in the same manner as in the Example 1, except that the binder was changed from the styrene-butadiene-styrene block copolymer (SBR) to another organic polymers.

Specifically, as the organic polymers other than the styrene-butadiene-styrene block copolymer, styrene-isoprene-styrene block copolymer (SIS), styrene-ethylene-butylene-styrene block copolymer (SEBS) and hot-melt resin were used, respectively.

Various binder particles were produced using the above organic polymers, and toluene as an organic solvent to be utilized for dissolving the organic polymers according to the steps <1-i> and <1-ii> described in the above embodiment.

Thereafter, various electrolyte mixture materials were prepared using the thus produced binder particles. In this regard, it is to be noted that an amount of the binder to an amount of each of the electrolyte mixture materials was 7 wt %.

Various solid electrolyte layers were formed using the electrolyte mixture materials, and ion conductivities thereof were measured in the same manner as in the Example 1. As a result, the ion conductivities of all of the solid electrolyte layers, which were obtained using the organic polymers other than the styrene-butadiene-styrene block copolymer as the binder, were $1.2 \times 10^{-3}$ S/cm or more.

These results showed that the solid electrolyte layers each formed in the Example 2 were no less advantageous than a solid electrolyte layer formed using only the electrolyte particles and having ion conductivity of $2.5 \times 10^{-2}$ S/cm. Namely, an effect of the present invention could be confirmed.

Example 3

In this Example 3, a silver-ion-conducting all-solid secondary battery was manufactured as an all-solid secondary battery in which the electrochemical device of the present invention was used.

When manufacturing the silver-ion-conducting all-solid secondary battery, the electrolyte mixture material prepared in the Example 1 was utilized as an electrolyte mixture material to be used for forming a solid electrolyte layer. In this regard, it is to be noted that the electrode mixture material having the amount of the styrene-butadiene-styrene block copolymer of 8 wt % to the amount thereof was utilized.

On the other hand, an electrode mixture material to be used for forming electrode layers was prepared as follows. Specifically, first, δ-type silver vanadate ($\delta$-$Ag_{0.7}V_2O_5$) particles were prepared as electrode active material particles, iodinated silver tungstate ($Ag_6I_4WO_4$) particles were prepared as electrolyte particles, and iodinated silver tungstate ($Ag_6I_4WO_4$) particles each carrying styrene-butadiene-styrene block copolymer (SBR) in a weight ratio of 20 wt % were prepared as binder particles, respectively.

Next, the δ-type silver vanadate particles and the iodinated silver tungstate particles were mixed with each other in a weight ratio of 6:4, and then the iodinated silver tungstate ($Ag_6I_4WO_4$) particles each carrying the styrene-butadiene-styrene block copolymer were added to the same.

Thereafter, these particles were sufficiently mixed with each other and crushed to thereby obtain the electrode mixture material. In this regard, it is to be noted that an amount of the styrene-butadiene-styrene block copolymer to an amount of the electrode mixture material was 8 wt %.

Using the electrolyte mixture material and the electrode mixture material, a coin type all-solid secondary battery shown in FIG. 4 was manufactured. As shown in FIG. 4, a battery device was configured by interposing a solid electrolyte layer 5 between a cathode layer 3 and an anode layer 4.

In the battery device, the cathode layer 3 and the anode layer 4 were formed using the above mentioned electrode mixture material. Therefore, the cathode layer 3 and the anode layer 4 had the same electrode mixture material composition. Further, each of the cathode layer 3 and the anode layer 4 was formed from the same electrode layer 603 having a disk shape and a structure [G] shown in FIG. 3.

In this regard, a cathode collector, in which a cathode expanded mesh 6031 and a cathode lead board 6032 were joined together, was buried in the cathode layer 3, and an anode collector, in which an anode expanded mesh 6041 and an anode lead board 6042 were joined together, was buried in the anode layer 4.

The battery device was manufactured according to the step <c>, that is, the battery device manufacturing step 30 described in the above embodiment.

First, as shown in the right side of FIG. 3, molds including a female mold having an internal diameter of 10 mm and an external diameter 30 mm were prepared as molds to be used for forming an electrode layer.

Next, the cathode layer 3 and the anode layer 4 were formed using the thus prepared molds and the above prepared electrode mixture material. As the cathode layer 3 and the anode layer 4, the electrode layers 603 each having a disk shape with a diameter of 10 mm and a thickness of 0.5 mm and a structure [G] shown in FIG. 3 were formed.

Next, as shown in the right side of FIG. 6, a female mold 1003 to be used for forming a battery device was prepared. In this regard, the female mold 1003 had an external diameter of 30 mm and a cylindrical hole 1005 with an internal diameter of 11 mm. One male mold 4006 having a protrusion portion 4007 with a diameter of 10.4 mm and a thickness of 0.5 mm was inserted into the cylindrical hole 1005 of the female mold 1003 as a lower mold.

In this state, the electrolyte mixture material 1000 was filled in the cylindrical hole 1005, a top surface of a layer formed of the electrolyte mixture material 1000 was leveled, the other male mold 4006 was inserted into the cylindrical hole 1005 as an upper mold, and then the two male molds 4006 were lightly pressed so that the electrolyte mixture material 1000 was molded, to thereby obtain a solid electrolyte layer 104 having a structure [D] shown in FIG. 1.

Thereafter, the other male mold 4006 was removed from the cylindrical hole 1005, and the cathode layer 3 formed in advance, in which the cathode collector obtained by joining the cathode lead board and the cathode expanded mesh was buried, was inserted into one of recess portions formed on both of surfaces of the solid electrolyte layer 104.

Next, a male mold 1004 having no protrusion portion was inserted into the cylindrical hole 1005, and then this male mold 1004 and the one male mold 4006 are lightly pressed, to thereby obtain a solid electrolyte layer 5 (104) having a structure [IV] shown in FIG. 6.

At this time, a molding pressure was preferably set to 3 ton/cm$^2$ or less. By doing so, it was possible to firmly join the anode layer and the solid electrolyte layer together in the subsequent step.

Subsequently, the female mold 1003 was turned over so that the other recess portion formed on the surface of the solid electrolyte layer 104, into which any member was not inserted, was positioned at an upper side. Then, the one male mold 4006 was removed from the cylindrical hole 1005, and the anode layer 4 formed in advance was inserted into the other recess portion.

Next, a male mold 1004 having no protrusion portion was inserted into the cylindrical hole 1005, and then the two male molds 1004 were pressed. In this way, a battery device 2 having a structure [V] shown in FIG. 6, in which the solid electrolyte layer 5 (104) was interposed between the cathode layer 3 and the anode layer 4, was manufactured.

At this time, a molding pressure was preferably set to 4 to 5 ton/cm$^2$ or less. By doing so, the cathode layer 3, the anode layer 4 and the solid electrolyte layer 5 (104) were firmly joined together.

Next, as shown in FIG. 4, a cathode lead board 6032 and an anode lead board 6042 were, respectively, attached to the cathode layer 3 and the anode layer 4 of the manufactured battery device 2. Thereafter, almost all of the battery device other than the cathode lead board 6032 and the anode lead board 6042 was covered with a hot-melt resin, and then it was cured.

A cured product of such a hot-melt resin would serve as a restrictor 6080 being able to suppress expansion and contraction of volumes of the cathode layer 3 and the anode layer 4 due to structural changes of crystals of the electrode active material when the battery device 2 is in charge-discharge operation.

In this regard, it is to be noted that an average thickness of the restrictor 6080 in an end portion of the battery device was 0.5 mm, and an average thickness thereof in a plane portion other than the end portion was 0.01 mm.

The thus obtained battery device 2 with the restrictor 6080 was inserted into a container body 90 of a battery container 9. Thermosetting epoxy powder was filled into a space formed within the container body 90, and then a top opening of the container body 90 was closed by a lid 91 through an insulating packing agent 17 while pressing the lid 91 against the container body 90.

Thereafter, the thermosetting epoxy powder filled into the space was heated together with the battery device 2 with the restrictor 6080 and the battery container 9 and cured. In this way, the silver-ion-conducting all-solid secondary battery shown in FIG. 4 was obtained.

Thereafter, an initial charge-discharge property and a property of a discharge voltage against a discharge current density of the thus obtained all-solid secondary battery were checked.

As the initial charge-discharge property, initial charge-discharge behavior was checked by charging the all-solid secondary battery up to 0.52 V at a current density of 0.1 mAh/cm$^2$, stopping charge operation at the moment when an electrical current became equal to 20 µA, and then discharging it at a current density of 0.1 mAh/cm$^2$.

On the other hand, as the property of the discharge voltage against the discharge current density, a terminal voltage of the all-solid secondary battery was checked at the moment when a discharge capacity thereof became equal to 10.0 mAh/gr against the used electrode active material by discharging it at a current density of 0.1, 0.2, 0.4, 0.6 or 1.0 mAh/cm$^2$ after it was charged in the same manner as described above.

Figure 10:
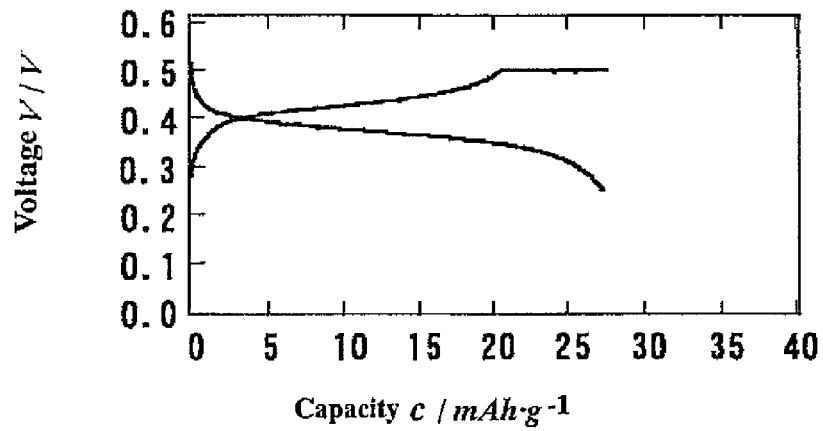
FIG. 10 is a graph showing an initial charge-discharge property of a silver-ion-conducting all-solid secondary battery.

In the graph of FIG. 10, the initial charge-discharge behavior of the all-solid secondary battery when charging-discharging it at a current density of 0.1 mAh/cm$^2$ was shown. The all-solid secondary battery had a charge-discharge capacity of about 27 mAh/gr and a discharge voltage of about 0.35 V. This behavior of the all-solid secondary battery corresponded to theoretical behavior.

Figure 11:
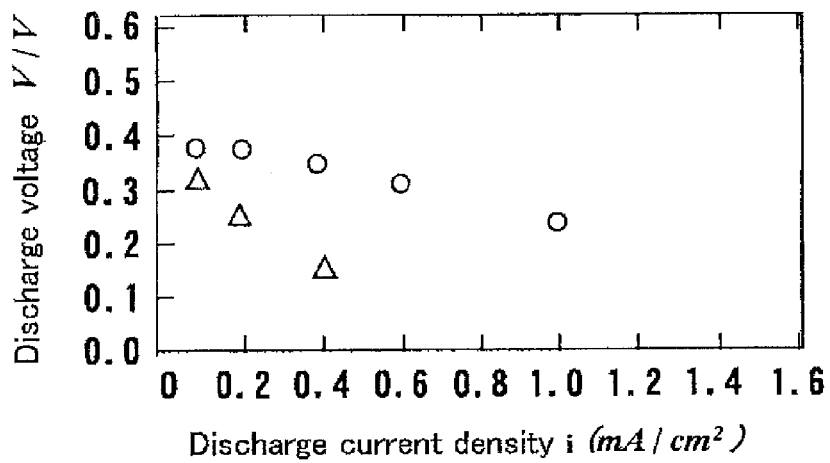
FIG. 11 is a graph showing a property of a discharge voltage against a discharge current density of a silver-ion-conducting all-solid secondary battery.

In the graph of FIG. 11, a value of the discharge voltage against each discharge current density of the all-solid secondary battery is shown with a symbol "O". According to this graph, it was confirmed that the all-solid secondary battery was discharged in the discharge voltage range of 0.25 to 0.37 V within the discharge current density range in the graph.

Comparative Example 2

In order to confirm an effect in the Example 3, an organic solvent (toluene) was added to the same electrolyte and electrode mixture materials as prepared in the Example 3 so that the binders contained therein were dissolved in the organic solvent to obtain various slurries.

Next, the organic solvent was evaporated and removed from the slurries to obtain solid matters, and then the solid matters were crushed using a planet ball milling machine in the size of about 20 micrometers or less, to thereby obtain crushed matters.

Next, using these crushed matters as electrolyte and electrode mixture materials, a conventional all-solid secondary battery was manufactured in the same manner as in the Example 3.

Thereafter, a property of a discharge voltage against a discharge current density of the thus obtained conventional all-solid secondary battery was checked.

As the property of the discharge voltage against the discharge current density, a terminal voltage of the conventional all-solid secondary battery was checked at the moment when a discharge capacity thereof became equal to 10.0 mAh/gr against the used electrode active material by discharging it at a current density of 0.1, 0.2 or 0.4 mAh/cm$^2$, after it was charged up to 0.52 V at a current density of 0.1 mAh/cm$^2$ and charge operation was stopped at the moment when an electrical current became equal to 20 μA.

In the graph of FIG. 11, a value of the discharge voltage against each discharge current density of the conventional all-solid secondary battery is shown with a symbol "Δ". According to this graph, the terminal voltage thereof was about 0.31 V in the current density of 0.1 mAh/cm$^2$, was about 0.25 V in the current density of 0.2 mAh/cm$^2$, and was about 0.15 V in the current density of 0.4 mAh/cm$^2$, respectively.

It was confirmed that the discharge property of the conventional all-solid secondary battery manufactured in the Comparative Example 2 was significantly lower than that of the all-solid secondary battery manufactured in the Example 3.

What is claimed is:

1. An electrochemical device, comprising:
   a pair of electrode layers;
   a solid electrolyte layer provided between the pair of electrode layers; and
   a collector on which at least one layer of the electrode layers is provided, the collector including a conducting mesh member and an electrode lead board joined to the conducting mesh member,
   wherein the at least one layer of the electrode layers is constituted of a single layer containing mixed and crushed (i) electrode active material particles, each providing a function of the single layer, (ii) electrochemically inactive insulating particles, and (iii) a binder which is composed of an organic polymer and binds the electrode active material particles and the electrochemically inactive insulating particles,
   wherein the solid electrolyte layer contains a lithium-ion-conducting solid electrolyte,
   wherein the binder is carried on at least a part of a surface of each of the electrochemically inactive insulating particles,
   wherein the electrochemically inactive insulating particles are at least one of a silica and a zirconia,
   wherein the single layer is provided on the electrode lead board of the collector, and
   wherein the conducting mesh member of the collector is buried in the single layer.

2. The electrochemical device as claimed in claim 1, wherein the organic polymer is at least one kind selected from the group comprising polyamide and polyimide as a major component thereof.

3. The electrochemical device as claimed in claim 1, wherein the lithium-ion-conducting solid electrolyte contains at least one kind of a crystalline sulfide-based lithium-ion-conducting solid electrolyte and an amorphous sulfide-based lithium-ion-conducting solid electrolyte.

4. The electrochemical device as claimed in claim 1, wherein the lithium-ion-conducting solid electrolyte contains both of a crystalline sulfide-based lithium-ion-conducting solid electrolyte and an amorphous sulfide-based lithium-ion-conducting solid electrolyte.

5. The electrochemical device as claimed in claim 1, wherein the solid electrolyte layer further contains a binder and electrochemically inactive insulating particles.

6. The electrochemical device as claimed in claim 1,
   wherein the electrochemically inactive insulating particles and the binder constitute binder particles, and
   wherein an average particle size of the electrode active material particles and the binder particles in the single layer is in the range of 5 to 30 micrometers.

7. The electrochemical device as claimed in claim 1, wherein an occupation percentage of through-holes or recess portions of the conducting mesh member in a plan view is in the range of 25 to 95%.

8. The electrochemical device as claimed in claim 1, wherein an average thickness of the collector is in the range of 50 to 400 μm.

9. The electrochemical device as claimed in claim 1, wherein the collector further includes a flame member provided along a periphery portion of the single layer.

* * * * *